(12) United States Patent
Matsumura et al.

(10) Patent No.: US 12,058,624 B2
(45) Date of Patent: Aug. 6, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 316 days.

(21) Appl. No.: 17/620,893

(22) PCT Filed: Jun. 21, 2019

(86) PCT No.: PCT/JP2019/024807
§ 371 (c)(1),
(2) Date: Dec. 20, 2021

(87) PCT Pub. No.: WO2020/255401
PCT Pub. Date: Dec. 24, 2020

(65) Prior Publication Data
US 2022/0369242 A1 Nov. 17, 2022

(51) Int. Cl.
*H04W 52/24* (2009.01)
*H04W 52/32* (2009.01)
*H04W 80/02* (2009.01)

(52) U.S. Cl.
CPC ....... *H04W 52/325* (2013.01); *H04W 52/242* (2013.01); *H04W 80/02* (2013.01)

(58) Field of Classification Search
CPC ..... H04W 52/04; H04W 52/06; H04W 52/18; H04W 52/226; H04W 52/24; H04W 52/242; H04W 52/246; H04W 52/247; H04W 52/248; H04W 52/30; H04W 52/32; H04W 52/325; H04W 72/20; H04W 72/23; H04W 72/231; H04W 80/00; H04W 80/02
See application file for complete search history.

(56) References Cited

U.S. PATENT DOCUMENTS

2014/0016576 A1* 1/2014 Noh ..................... H04W 52/247
370/329
2019/0281588 A1* 9/2019 Zhang .................. H04B 7/0617
(Continued)

FOREIGN PATENT DOCUMENTS

JP 2020136759 A 8/2020
WO 2018128409 A1 7/2018

OTHER PUBLICATIONS

Office Action in the counterpart Chinese Application No. 201980099577. 3, mailed May 5, 2023 (27 pages).
(Continued)

*Primary Examiner* — Matthew W Genack
(74) *Attorney, Agent, or Firm* — Osha Bergman Watanabe & Burton LLP

(57) ABSTRACT

A terminal according to an aspect of the present disclosure includes a control section that determines a power control parameter for a sounding reference signal (SRS) based on a medium access control—control element (MAC CE), and a transmitting section that uses a transmission power based on the power control parameters to transmit the SRS. According to an aspect of the present disclosure, the parameter for the transmission power control can be appropriately controlled.

5 Claims, 21 Drawing Sheets

(56) References Cited

U.S. PATENT DOCUMENTS

2021/0297956 A1   9/2021  Park et al.
2022/0132430 A1   4/2022  Hoshino

OTHER PUBLICATIONS

International Search Report issued in PCT/JP2019/024807 on Jan. 7, 2020 (2 pages).
Written Opinion of the International Searching Authority issued in PCT/JP2019/024807 on Jan. 7, 2020 (4 pages).
Ericsson; "Signalling reduction for beam-based UL power control"; 3GPP TSG-RAN WG1 Meeting #97, Tdoc R1-1907475; Reno, USA; May 13-17, 2019 (5 pages).
Ericsson; "Comparison of MAC CE signalling options for spatial relation update of aperiodic SRS"; 3GPP TSG-RAN WG1 Meeting #97, Tdoc R1-1907473; Reno, USA; May 13-17, 2019 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Japanese Application No. 2021-528619; Dated Sep. 27, 2022 (6 pages) .
Office Action in the counterpart Chinese Application No. 201980099577.3 mailed Oct. 31, 2023 (25 pages).

* cited by examiner

| SRI FIELD VALUE | POWER CONTROL CONFIGURATION |
|---|---|
| 0 | P0#0, α#0, PATH LOSS REFERENCE #0, POWER CONTROL ADJUSTMENT STATE #0 |
| 1 | P0#1, α#1, PATH LOSS REFERENCE #1, POWER CONTROL ADJUSTMENT STATE #1 |

FIG. 1

```
SRS-ResourceSet ::= SEQUENCE {
  ...
  alpha Alpha OPTIONAL, -- Need S
  p0 INTEGER (-202..24) OPTIONAL, -- Cond Setup
  pathlossReferenceRS CHOICE {
    ssb-Index SSB-Index,
    csi-RS-Index NZP-CSI-RS-ResourceId
  } OPTIONAL, -- Need M
  srs-PowerControlAdjustmentStates ENUMERATED { sameAsFci2, separateClosedLoop} OPTIONAL, -- Need S
  ...
  alpha-Set SEQUENCE (SIZE (1..maxNrofSRS-Alpha-PerSet)) OF Alpha-SRS OPTIONAL, -- Need M
  p0-Set SEQUENCE (SIZE (1..maxNrofSRS-P0-PerSet)) OF P0-SRS OPTIONAL, -- Need M
  srs-PathlossReferenceRSs SEQUENCE (SIZE (1..maxNrofSRS-PathlossReferenceRSs)) OF SRS-PathlossReferenceRS OPTIONAL, --
}
```

FIG. 4

```
SRS-ResourceSet ::= SEQUENCE {
 ...
 alpha Alpha OPTIONAL, -- Need S
 p0 INTEGER (-202..24) OPTIONAL, -- Cond Setup
 pathlossReferenceRS CHOICE {
  ssb-Index SSB-Index,
  csi-RS-Index NZP-CSI-RS-ResourceId
 } OPTIONAL, -- Need M
 srs-PowerControlAdjustmentStates ENUMERATED { sameAsFci2, separateClosedLoop} OPTIONAL, -- Need S
 ...
 alpha-Set SEQUENCE (SIZE (1..maxNrofSRS-Alpha-PerSet)) OF Alpha-SRS OPTIONAL, -- Need M
 p0-Set SEQUENCE (SIZE (1..maxNrofSRS-P0-PerSet)) OF P0-SRS OPTIONAL, -- Need M
 pathlossReferenceRSToAddModList SEQUENCE (SIZE (1.. maxNrofSRS-PathlossReferenceRSs)) OF SRS-PathlossReferenceRSs OPTIONAL, -- Need N
 pathlossReferenceRSToReleaseList SEQUENCE (SIZE (1.. maxNrofSRS-PathlossReferenceRSs)) OF SRS-PathlossReferenceRSs OPTIONAL, -- Need N
}
```

FIG. 5

```
SRS-PathlossReferenceRS ::= SEQUENCE {
  srs-PathlossReferenceRS-Id SRS-PathlossReferenceRS-Id,
  referenceSignal CHOICE {
    ssb-Index SSB-Index,
    csi-RS-Index NZP-CSI-RS-ResourceId
  }
}

Alpha-SRS ::= SEQUENCE {
  alpha-SRS-Id Alpha-SRS-Id,
  alpha Alpha,
}

Alpha-SRS-Id ::= INTEGER (1..8)

Alpha ::= ENUMERATED {alpha0, alpha04, alpha05, alpha06, alpha07, alpha08, alpha09, alpha1}

P0-SRS ::= SEQUENCE {
  p0-SRS-Id P0-SRS-Id,
  p0-SRS-Value INTEGER (-16..15)
}

P0-SRS-Id ::= INTEGER (1..8)
```

FIG. 6

```
SRS-Resource ::= SEQUENCE {
...
alpha Alpha OPTIONAL, -- Need S
p0 INTEGER (-202..24) OPTIONAL, -- Cond Setup
pathlossReferenceRS CHOICE {
    ssb-Index SSB-Index,
    csi-RS-Index NZP-CSI-RS-ResourceId
} OPTIONAL, -- Need M
srs-PowerControlAdjustmentStates ENUMERATED { sameAsFci2, separateClosedLoop} OPTIONAL, -- Need S
...
}
```

FIG. 7

```
SRS-Resource ::= SEQUENCE {
  ...
  alpha-Set SEQUENCE (SIZE (1..maxNrofSRS-Alpha-PerSet)) OF Alpha-SRS OPTIONAL, -- Need M
  p0-Set SEQUENCE (SIZE (1..maxNrofSRS-P0-PerSet)) OF P0-SRS OPTIONAL, -- Need M
  srs-pathlossReferenceRSs SEQUENCE (SIZE (1..maxNrofSRS-PathlossReferenceRSs)) OF SRS-PathlossReferenceRS
OPTIONAL, --
  ...
}
```

FIG. 8

```
SRS-Resource ::= SEQUENCE {
   ...
   alpha-Set SEQUENCE (SIZE (1..maxNrofSRS-Alpha-PerSet)) OF Alpha-SRS OPTIONAL, -- Need M
   p0-Set SEQUENCE (SIZE (1..maxNrofSRS-P0-PerSet)) OF P0-SRS OPTIONAL, -- Need M
   pathlossReferenceRSToAddModList SEQUENCE (SIZE (1..maxNrofSRS-PathlossReferenceRSs)) OF SRS-PathlossReferenceRSs OPTIONAL, -- Need N
   pathlossReferenceRSToReleaseList SEQUENCE (SIZE (1..maxNrofSRS-PathlossReferenceRSs)) OF SRS-PathlossReferenceRSs OPTIONAL, -- Need N
   ...
}
```

FIG. 9

```
SRS-SpatialRelationInfo ::= SEQUENCE {
    ...
    alpha Alpha OPTIONAL, -- Need S
    p0 INTEGER (-202..24) OPTIONAL, -- Cond Setup
    pathlossReferenceRS CHOICE {
        ssb-Index SSB-Index,
        csi-RS-Index NZP-CSI-RS-ResourceId
    } OPTIONAL, -- Need M
    srs-PowerControlAdjustmentStates ENUMERATED { sameAsFci2, separateClosedLoop} OPTIONAL, -- Need S
    ...
}
```

FIG. 10

| ID | POWER CONTROL ADJUSTMENT STATE |
|---|---|
| #0 | POWER CONTROL ADJUSTMENT STATE #0 |
| #1 | POWER CONTROL ADJUSTMENT STATE #1 |
| #2 | POWER CONTROL ADJUSTMENT STATE #2 |
| #3 | POWER CONTROL ADJUSTMENT STATE #3 |

FIG. 15

| A-SRS RESOURCE ID | POWER CONTROL ADJUSTMENT STATE |
|---|---|
| #0 | POWER CONTROL ADJUSTMENT STATE #0 |
| #1 | POWER CONTROL ADJUSTMENT STATE #1 |
| #2 | POWER CONTROL ADJUSTMENT STATE #2 |
| #3 | POWER CONTROL ADJUSTMENT STATE #3 |

FIG. 16

| PATHLOSS REFERENCE RS ID | POWER CONTROL ADJUSTMENT STATE |
|---|---|
| #0 | POWER CONTROL ADJUSTMENT STATE #0 |
| #1 | POWER CONTROL ADJUSTMENT STATE #1 |
| #2 | POWER CONTROL ADJUSTMENT STATE #2 |
| #3 | POWER CONTROL ADJUSTMENT STATE #3 |

FIG. 17

TERMINAL AND RADIO COMMUNICATION METHOD

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In existing LTE systems (for example, LTE Rel. 8 to Rel. 14), a user terminal (User Equipment (UE)) controls a transmission of an uplink shared channel (Physical Uplink Shared Channel (PUSCH)) based on a downlink control information (DCI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a study is underway to indicate parameters for transmission power control for uplink (UL) transmission such as a PUCCH, a PUSCH, and an SRS by the downlink control information (DCI) or the like.

However, the number of candidates for values of the parameters for the transmission power control is restricted. Unless the parameters are appropriately determined, deterioration of system performance may occur.

In view of these, an object of the present disclosure is to provide a terminal and a radio communication method capable of appropriately determining a parameter for transmission power control.

Solution to Problem

A terminal according to an aspect of the present disclosure includes a control section that determines a power control parameter for a sounding reference signal (SRS) based on a medium access control—control element (MAC CE), and a transmitting section that uses a transmission power based on the power control parameters to transmit the SRS.

Advantageous Effects of Invention

According to an aspect of the present disclosure, the parameter for the transmission power control can be appropriately controlled.

BRIEF DESCRIPTION OF DRAWINGS

FIG. 1 is a diagram to show an example of association between an SRI field value and a power control configuration in Rel. 15 NR;

FIG. 4 is a diagram to show an example of a power control parameter set configured by SRS resource set information;

FIG. 5 is a diagram to show an example of a power control parameter list configured by the SRS resource set information;

FIG. 6 is a diagram to show an example of definition of power control parameters;

FIG. 7 is a diagram to show an example of power control parameters configured by SRS resource information;

FIG. 8 is a diagram to show an example of the power control parameter set configured by the SRS resource information;

FIG. 9 is a diagram to show an example of the power control parameter list configured by the SRS resource information;

FIG. 10 is a diagram to show an example of the power control parameters configured by SRS spatial relation information;

FIG. 15 is a diagram to show an example of association between an ID and a power control adjustment state;

FIG. 16 is a diagram to show an example of association between an A-SRS resource ID and the power control adjustment state;

FIG. 17 is a diagram to show an example of association between a pathloss reference RS ID and the power control adjustment state;

Figure 2:
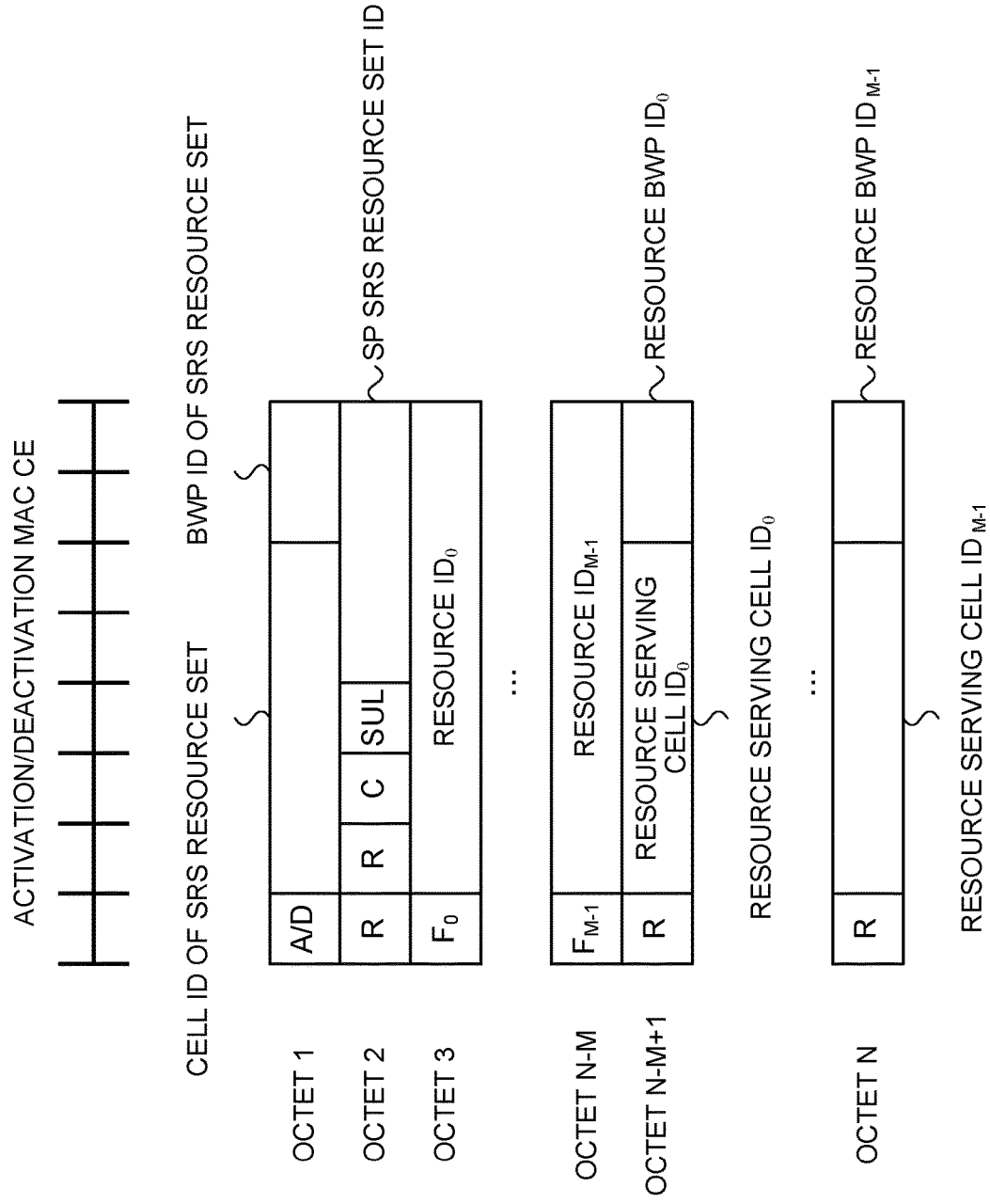
FIG. 2 is a diagram to show an example of SP SRS activation/deactivation MAC CE.

DESCRIPTION OF EMBODIMENTS (TCI, Spatial Relation, QCL)

For NR, a study is underway to control reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE based on a transmission configuration indication state (TCI state).

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) are described below:

QCL type A: Doppler shift, Doppler spread, average delay, and delay spread
QCL type B: Doppler shift and Doppler spread
QCL type C: Doppler shift and Average delay
QCL type D: Spatial reception parameter A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel based on the TCI state or the QCL assumption of the signal/channel.

The TCI state may be, for example, information related to QCL between a channel as a target (or a reference signal (RS) for the channel) and another signal (for example, another downlink reference signal (DL-RS)). The TCI state may be configured (indicated) by higher layer signaling or physical layer signaling, or a combination of these.

In the present disclosure, for example, the higher layer signaling may be any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS (DL-RS) to have a QCL relationship with the channel may be, for example, at least one of a synchronization signal block (SSB), a channel state information reference signal (CSI-RS), and a reference signal for measurement (Sounding Reference Signal (SRS)). Alternatively, the DL-RS may be a CSI-RS used for tracking (also referred to as a Tracking Reference Signal (TRS)), or a reference signal used for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the DL-RS to have a QCL relationship (DL-RS relation information) and information indicating a QCL type (QCL type information). The DL-RS relation information may include information such as an index of the DL-RS (for example, an SSB index, or a non-zero power CSI-RS (NZP CSI-RS) resource ID (Identifier)), an index of a cell in which the RS is located, and an index of a Bandwidth Part (BWP) in which the RS is located.

<TCI State for PDCCH>

Information for QCL with a PDCCH (or a demodulation reference signal (DMRS) antenna port related to the PDCCH) and a given DL-RS may be referred to as a TCI state for PDCCH.

The UE may determine the TCI state for a UE-specific PDCCH (CORESET) based on the higher layer signaling. For example, one or a plurality of (K) TCI states per CORESET may be configured for the UE through RRC signaling.

The UE may be activated in one of the plurality of TCI states configured through RRC signaling by the MAC CE for each CORESET. The MAC CE may be referred to as a TCI state indication for UE-specific PDCCH MAC CE. The UE may monitor the CORESET based on an active TCI state corresponding to the CORESET.

<TCI State for PDSCH>

Information for QCL with a PDSCH (or a DMRS antenna port related to the PDSCH) and a given DL-RS may be referred to as a TCI state for PDSCH.

The UE may be notified of (configured with) M (M 1) TCI states for PDSCH (M pieces of QCL information for PDSCH) through higher layer signaling. Note that the number M of TCI states configured for the UE may be restricted by at least one of UE capability and the QCL type.

The DCI used for scheduling of a PDSCH may include a given field indicating a TCI state for the PDSCH (which may be referred to as a TCI field, a TCI state field, and the like, for example). The DCI may be used for scheduling of a PDSCH in one cell, and may be referred to as, for example, DL DCI, DL assignment, DCI format 1_0, DCI format 1_1, and the like.

Whether the TCI field is included in the DCI may be controlled by information notified from a base station to the UE. The information may be information indicating whether the TCI field is present or absent in the DCI (for example, TCI present information, TCI present information in DCI, or higher layer parameter TCI-PresentInDCI). For example, the information may be configured for the UE through higher layer signaling.

In a case that more than eight types of TCI states are configured for the UE, eight or less types of TCI states may be activated (or specified) by use of the MAC CE. The MAC CE may be referred to as a TCI states activation/deactivation for UE-specific PDSCH MAC CE. A value of the TCI field in the DCI may indicate one of the TCI states activated by the MAC CE.

In a case that the UE is configured with the TCI present information that is set as "enabled" for the CORESET scheduling the PDSCH (CORESET used for PDCCH transmission scheduling the PDSCH), the UE may assume that the TCI field is present in DCI format 1_1 of the PDCCH transmitted on the CORESET.

In a case that the TCI present information is not configured for the CORESET scheduling the PDSCH, or the PDSCH is scheduled by DCI format 1_0, when a time offset between reception of the DL DCI (DCI scheduling the PDSCH) and reception of the PDSCH corresponding to the DCI is equal to or greater than a threshold, the UE may assume that, for determining PDSCH antenna port QCL, the TCI state or the QCL assumption for PDSCH is identical to the TCI state or the QCL assumption applied to the CORESET used for the PDCCH transmission scheduling the PDSCH.

In the case that the TCI present information is set as "enabled," the TCI field in the DCI in a component carrier (CC) scheduling (the PDSCH) indicates the activated TCI state in the scheduled CC or DL BWP, and the PDSCH is scheduled by DCI format 1_1, the UE may use the TCI in accordance with the value of the TCI field in the PDCCH that has the DCI and detected, for determining the PDSCH antenna port QCL. In the case that the time offset between reception of the DL DCI (scheduling the PDSCH) and the PDSCH corresponding to the DCI (the PDSCH scheduled by the DCI) is equal to or greater than the threshold, the UE may assume that a DM-RS port of the PDSCH in the serving cell is QCLed with an RS in the TCI state for a QCL type parameter given by the indicated TCI state.

In a case that the UE is configured with a single slot PDSCH, the indicated TCI state may be based on the activated TCI state in the slot having the scheduled PDSCH. In a case that the UE is configured with a plurality of slot PDSCHs, the indicated TCI state may be based on the activated TCI state in the beginning slot having the scheduled PDSCH, and the UE may expect that the indicated TCI state is identical over the slots having the scheduled PDSCH. In a case that the UE is configured with the CORESET associated with a search space set for cross-carrier scheduling, the UE is configured with the TCI present information set as "enabled" for the CORESET, and in a case that at least one of the TCI states configured for the serving cell scheduled by the search space set includes the QCL type D, the UE may assume that a time offset between the detected PDCCH and the PDSCH corresponding to the PDCCH is equal to or greater than a threshold.

In an RRC connection mode, in both the case that the TCI information in the DCI (higher layer parameter TCI-PresentInDCI) is set as "enabled" and the case that the TCI information in the DCI is not configured, when a time offset between reception of the DL DCI (the DCI scheduling the PDSCH) and the corresponding PDSCH (the PDSCH scheduled by the DCI) is less than a threshold, the UE may assume that the DM-RS port of the PDSCH in the serving cell is QCLed with the RS with respect to the QCL parameter used for QCL indication of the PDCCH of the CORESET associated with the monitored search space, where one or more CORESETs in the active BWP in the serving cell have the minimum (lowest) CORESET-ID in the newest (latest) slot monitored by the UE.

The time offset between the reception of the DL DCI and the reception of the PDSCH corresponding to the DCI may be referred to as a scheduling offset.

The threshold described above may be referred to as "Threshold," "Threshold for offset between a DCI indicating a TCI state and a PDSCH scheduled by the DCI," "Threshold-Sched-Offset," "timeDurationForQCL," a schedule offset threshold, a scheduling offset threshold, QCL time length, and the like.

The scheduling offset threshold may be based on the UE capability, or delay taken for PDCCH decoding and beam switching, for example. Information of the scheduling offset threshold may be configured from the base station through higher layer signaling, or may be transmitted from the UE to the base station.

For example, the UE may assume that the DMRS port of the PDSCH described above is QCLed with the DL-RS based on the TCI state activated for the CORESET corresponding to the lowest CORESET-ID described above. The latest slot may be a slot that receives the DCI scheduling the PDSCH described above, for example.

Note that the CORESET-ID may be an ID configured by an RRC information element "ControlResourceSet" (ID for identifying the CORESET).

<Spatial Relation for PUCCH>

The UE may be configured with parameters used for the PUCCH transmission (PUCCH configuration information, PUCCH-Config) through higher layer signaling (for example, Radio Resource Control (RRC) signaling). The PUCCH configuration information may be configured per partial band (for example, uplink bandwidth part ((BWP)) in a carrier (also referred to as a cell, a component carrier, or the like).

The PUCCH configuration information may include a list of PUCCH resource set information (for example, PUCCH-ResourceSet) and a list of PUCCH spatial relation information (for example, PUCCH-SpatialRelationInfo).

The PUCCH resource set information may include a list of PUCCH resource indices (ID, for example, PUCCH-ResourceId) (for example, resourceList).

In a case that the UE does not have dedicated PUCCH resource configuration information (for example, dedicated PUCCH resource configuration) that is provided by the PUCCH resource set information in the PUCCH configuration information (before RRC setup), the UE may determine the PUCCH resource set based on parameters (for example, pucch-ResourceCommon) in system information (for example, System Information Block Type 1 (SIB1) or Remaining Minimum System Information (RMSI)). The PUCCH resource set may include 16 PUCCH resources.

On the other hand, in a case that the UE has the dedicated PUCCH resource configuration information described above (UE dedicated uplink control channel configuration, dedicated PUCCH resource configuration) (after the RRC setup), the UE may determine the PUCCH resource set in accordance with the number of UCI information bits.

The UE may determine one PUCCH resource (index) in the PUCCH resource set described above (for example, the PUCCH resource set determined in a set cell-specific or UE dedicated manner) based on at least one of a value of a given field in the downlink control information (DCI) (for example, DCI format 1_0 or 1_1 used for scheduling of a PDSCH) (for example, PUCCH resource indicator field), the number of CCEs ($N_{CCE}$) in a control resource set (CORE-SET) for PDCCH reception carrying the DCI, and an index of the CCE at the beginning (the first CCE) ($n_{CCE,\,0}$) of the PDCCH reception.

The PUCCH spatial relation information (for example, an RRC information element "PUCCH-spatialRelationInfo") may indicate a plurality of candidate beams for PUCCH transmission (spatial domain filter). The PUCCH spatial relation information may indicate a spatial association between an RS (Reference signal) and a PUCCH.

The list of the PUCCH spatial relation information may include some elements (PUCCH spatial relation information IE (Information Element)). Each piece of the PUCCH spatial relation information may include at least one of an index of the PUCCH spatial relation information (ID, for example, pucch-SpatialRelationInfoId), an index of the serving cell (ID, for example, servingCellId), and information for a RS (reference RS) spatially related to a PUCCH, for example.

For example, the information for the RS may be an SSB index, a CSI-RS index (for example, NZP-CSI-RS resource configuration ID), or an SRS resource ID and a BWP ID. The SSB index, the CSI-RS index, and the SRS resource ID may be associated with at least one of a beam, a resource, and a port selected by measuring the corresponding RS.

The UE may be indicated with one of one or more pieces of PUCCH spatial relation information in the list of the PUCCH spatial relation information (for example, PUCCH-SpatialRelationInfo, or candidate beam) by the MAC (Medium Access Control) CE (Control Element). The MAC CE may be a MAC CE activating or deactivating the PUCCH spatial relation information (PUCCH spatial relation information activation/deactivation MAC CE, PUCCH spatial relation information indication MAC CE).

The UE may transmit an acknowledgement (ACK) for the MAC CE activating given PUCCH spatial relation information, and 3 ms after the transmission, the UE may activate the PUCCH relation information indicated by the MAC CE.

The UE may control PUCCH transmission based on the PUCCH spatial relation information activated by the MAC CE. Note that a single piece of PUCCH spatial relation information is included in the list of the PUCCH spatial relation information, the UE may control PUCCH transmission based on the PUCCH spatial relation information.

<Spatial Relation for SRS, PUSCH>

The UE may receive information used to transmit a measurement reference signal (for example, sounding reference signal (SRS)) (SRS configuration information, for example, a parameter in an RRC control element "SRS-Config").

Specifically, the UE may receive at least one of information for one or a plurality of SRS resource sets (SRS resource set information, for example, an RRC control element "SRS-ResourceSet") and information for one or a plurality of SRS resources (SRS resource information, for example, an RRC control element "SRS-Resource").

One SRS resource set may be associated with the given number of SRS resources (may group the given number of SRS resources). Each SRS resource may be identified by an SRS resource indicator (SRI) or an SRS resource ID (identifier).

The SRS resource set information may include an SRS resource set ID (SRS-ResourceSetId), a list of SRS resource IDs (SRS-ResourceId) used in the resource set, an SRS resource type (for example, any of a periodic SRS, a semi-persistent SRS, and an aperiodic CSI (Aperiodic SRS)), and information of usage of the SRS.

Here, the SRS resource type may indicate any one of a periodic SRS (P-SRS), a semi-persistent SRS (SP-SRS), and an aperiodic CSI (aperiodic SRS, A-SRS). Note that the UE may periodically (or periodically after the activation) transmit the P-SRS and the SP-SRS, and transmit the A-SRS based on an SRS request in the DCI.

The usage (an RRC parameter "usage," a L1 (Layer-1) parameter "SRS-SetUse") may be, for example, beam management (beamManagement), codebook (CB), nonCodebook (NCB), and antenna switching. The SRS for codebook or non-codebook usage may be used to determine a precoder for codebook based or non-codebook based PUSCH transmission based on the SRI.

For example, in a case of a codebook based transmission, the UE may determine the precoder for PUSCH transmission based on an SRI, a transmitted rank indicator (TRI), and a transmitted precoding matrix indicator (TPMI). In a case of a non-codebook based transmission, the UE may determine the precoder for PUSCH transmission based on an SRI.

The SRS resource information may include an SRS resource ID (SRS-ResourceId), the number of SRS ports, an SRS port number, a transmission Comb, an SRS resource mapping (for example, time and/or frequency resource location, resource offset, resource periodicity, the number of repetitions, the number of SRS symbols, an SRS bandwidth, or the like), hopping related information, an SRS resource type, a sequence ID, spatial relation information for an SRS, and the like.

The spatial relation information for an SRS (for example, an RRC information element "spatialRelationInfo") may indicate the spatial relation information between the given reference signal and the SRS. The given reference signal may be at least one of a synchronization signal/broadcast channel (Synchronization Signal/Physical Broadcast Channel, SS/PBCH) block, a channel state information reference signal (CSI-RS), and an SRS (for example, another SRS). The SS/PBCH block may be referred to as a synchronization signal block (SSB).

The spatial relation information for an SRS may include at least one of the SSB index, the CSI-RS resource ID, and the SRS resource ID as an index of the given reference signal described above.

Note that in the present disclosure, the SSB index, the SSB resource ID, and a SSBRI (SSB Resource Indicator) may be interchangeably interpreted. The CSI-RS index, the CSI-RS resource ID, and the CRI (CSI-RS Resource Indicator) may be interchangeably interpreted. The SRS index, the SRS resource ID, and the SRI may be interchangeably interpreted.

The spatial relation information for an SRS may include the serving cell index, the BWP index (BWP ID), and the like corresponding to the given reference signal described above.

In NR, uplink signal transmission may be controlled based on presence or absence of beam correspondence (BC). The BC may be, for example, capability for a node (for example, the base station or the UE) to determine a beam used for signal transmission (transmit beam, Tx beam) based on a beam used for signal reception (receive beam, Rx beam).

Note that the BC may be referred to as a transmit/receive beam correspondence (Tx/Rx beam correspondence), a beam reciprocity, a beam calibration, Calibrated/Non-calibrated, reciprocity calibrated/non-calibrated), correspondence degree, coincidence degree, or the like.

For example, in a case of with no BC, the UE may use the beam (spatial domain transmission filter) the same as the SRS (or SRS resource) indicated from the base station based on measurement results of one or more SRSs (or SRS resources) to transmit the uplink signal (for example, PUSCH, PUCCH, SRS, and the like).

On the other hand, in a case of with BC, the UE may use a beam (spatial domain transmission filter) the same as or corresponding to a beam used to receive a given SSB or CSI-RS (or CSI-RS resource) (spatial domain reception filter) to transmit the uplink signal (for example, PUSCH, PUCCH, SRS, and the like).

In a case that the UE is configured, with respect to an SRS resource, with the spatial relation information for a SSB or a CSI-RS and an SRS (for example, in the case of with BC), the UE may use a spatial domain filter (spatial domain transmission filter) the same as a spatial domain filter (spatial domain reception filter) for receiving the SSB or the CSI-RS to transmit the SRS resource. In this case, the UE may assume that a UE receive beam for the SSB or the CSI-RS is the same as a UE transmit beam for the SRS.

In a case that the UE is configured, with respect to an SRS (target SRS) resource, with the spatial relation information for another SRS (reference SRS) and the SRS (target SRS) (for example, in the case of with no BC), the UE may use a spatial domain filter (spatial domain transmission filter) the same as a spatial domain filter (spatial domain transmission filter) for transmitting the reference SRS to transmit the target SRS resource. In other words, in this case, the UE may assume that a UE transmit beam for the reference SRS is the same as a UE transmit beam for the target SRS.

The UE may determine the spatial relation for a PUSCH scheduled by DCI based on a value of a given field in the DCI (for example, DCI format 0_1) (for example, SRS resource indicator (SRI) field). Specifically, the UE may use the spatial relation information for an SRS resource determined based on the value of the given field (for example, SRI) (for example, an RRC information element "spatial-RelationInfo") for the PUSCH transmission.

(Multi-TRP)

For NR, a study is underway that one or a plurality of transmission/reception points (TRPs) (multi-TRP) use one or a plurality of panels (multi-panel) to perform DL transmission to the UE. A study is also underway that the UE performs UL transmission to one or the plurality of TRPs.

Note that the plurality of TRPs may correspond to the same cell identifier (cell ID), or different cell IDs. The cell ID may be a physical cell ID, or a virtual cell ID.

From the respective TRPs of the multi-TRP, different code words (CW) and different layers may be transmitted. A non-coherent joint transmission (NCJT) is under study as one mode of multi-TRP transmission.

In NCJT, for example, TRP 1 performs modulation mapping and layer mapping of a first code word, and use a first precoding a first number of layers (for example, two layers) to transmit a first PDSCH. Moreover, TRP 2 performs modulation mapping and layer mapping of a second code word, and use a second precoding a second number of layers (for example, two layers) to transmit a second PDSCH.

These first and second PDSCHs may be assumed to be not quasi-co-located (QCLed) with each other.

Note that a plurality of PDSCH transmitted by the NCJT may be defined to partially or fully overlap in at least one of the time or frequency domains. In other words, the first PDSCH from a first TRP and the second PDSCH from a second TRP may overlap each other in at least one of the time or frequency resources.

(Pathloss Reference RS)

The pathloss reference RS (reference signal (RS) for pathloss reference, pathloss reference RS, pathloss measurement RS) is used to calculate a pathloss for PUSCH or PUCCH or SRS. In Rel. 15 NR, the maximum number of the pathloss reference RSs is four. In other words, the UE does not expect to simultaneously hold more than four pathloss reference RSs per serving cell for all transmissions of PUSCH and PUCCH and SRS.

(Transmission Power Control)

<PUSCH Transmission Power Control>

In NR, a PUSCH transmission power is controlled based on a TPC command (also referred to as a value, an increase-decrease value, a correction value, or the like) indicated by a given field in the DCI (also referred to as a TPC command field, or the like).

For example, in a case that the UE uses a parameter set having an index j (open loop parameter set) and an index l of a power control adjustment state to transmit a PUSCH on an active UL BWP b of a carrier f of a serving cell c, a PUSCH transmission power ($P_{PUSCH, b, f, c}(i, j, q_d, l)$) in a PUSCH transmission occasion i (also referred to as transmission duration or the like) may be expressed by Equation (1) below.

Here, whether the power control adjustment state has a plurality of states (for example, two states) or a single state may be configured by the higher layer parameter. In a case that a plurality of power control adjustment states are configured, one of the plurality of power control adjustment states may be identified by the index l (for example, $l \in \{0, 1\}$). The power control adjustment state may be referred to as a PUSCH power control adjustment state, a first or second state, or the like.

The PUSCH transmission occasion i is a given duration in which a PUSCH is transmitted, and may include for example, one or more symbols, one or more slots, and the like.

[Math. 1]

$$P_{PUSCH,b,f,c}(i, j, q_d, l) = \min\begin{cases} P_{CMAX,f,c}(i), \\ P_{O\_PUSCH,b,f,c}(j) + 10\log_{10}\left(2^\mu \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l) \end{cases}$$

Equation (1)

In Equation (1), $P_{CMAX, f, c}(i)$ represents, for example, a transmission power of a user terminal configured for the carrier f of the serving cell c in the transmission occasion i (also referred to as a maximum transmission power, a UE maximum output power, or the like). $P_{O\_PUSCH, b, f, c}(j)$ represents, for example, a parameter for a target received power configured for the active UL BWP b of the carrier f of the serving cell c in the transmission occasion i (also referred to as, for example, a parameter for a transmission power offset, a transmission power offset P0, a target received power parameter, or the like).

$M^{PUSCH}_{RB,b,f,c}(i)$ represents, for example, the number of resource blocks (bandwidth) allocated to a PUSCH for the transmission occasion i in the active UL BWP b of the carrier f with the serving cell c and a subcarrier spacing μ. $α_{b,f,c}(j)$ represents a value provided by the higher layer parameter (also referred to as, for example, msg3-Alpha, p0-PUSCH-Alpha, a fractional factor, or the like).

$PL_{b,f,c}(q_d)$ represents, for example, a pathloss (pathloss compensation) calculated by the user terminal using the index $q_d$ of a reference signal for downlink BWP associated with the active UL BWP b of the carrier f of the serving cell c (pathloss reference RS, pathloss measurement DL RS, PUSCH-PathlossReferenceRS).

$Δ_{TF,b,f,c}(i)$ represents a transmission power adjustment component for the UL BWP b of the carrier f of the serving cell c (offset, transmission format compensation).

$f_{b,f,c}(i, l)$ represents a value based on the TPC command having the power control adjustment state index l described above for the active UL BWP of the carrier f of the serving cell c and the transmission occasion i (for example, the power control adjustment state, an accumulated value of the TPC command, or a value by a closed loop). For example, $f_{b,f,c}(i, l)$ may be expressed by Equation (2). l may be referred to as a closed loop index.

$$f_{b,f,c}(i,l)=f_{b,f,c}(i_{last},l)+δ_{PUSCH,b,f,c}(i_{last},K_{PUSCH},l)$$ Equation (2)[Math. 2]

In Equation (2), $δ_{PUSCH,b,f,c}(i_{last}, i, K_{PUSCH}, l)$ may represent, for example, a TPC command indicated by the TPC command field value in the DCI (for example, DCI format 0_0 or 0_1) detected in the active UL BWP b of the carrier f of the serving cell c for the transmission occasion i that is after an immediately before PUSCH transmission occasion $i_{last}$, or a TPC command indicated by the TPC command field value in the DCI (for example, DCI format 2_2) having CRC parity bits scrambled (CRC-scrambled) with a specific RNTI (Radio Network Temporary Identifier) (for example, TPC-PUSCH-RNTI).

In a case that the UE is not provided with the pathloss reference RS (for example, PUSCH-PathlossReferenceRS), or the UE is not provided with the dedicated higher layer parameter, the UE may calculate $PL_{b,f,c}(q_d)$ by using a RS resource from the SSB used for obtaining a Master Information Block (MIB).

In a case that the UE is configured with the RS resource indices the number of which is up to a value of the maximum number of pathloss reference RSs (for example, maxNrof-PUSCH-PathlossReferenceRS) and a set of RS configurations for the respective RS resource indices by the pathloss reference RS, a set of RS resource indices may include one of or both a set of SS/PBCH block indices and a set of CSI-RS resource indices. The UE may identify the RS resource index $q_d$ in the set of RS resource indices.

In a case that the PUSCH transmission is scheduled by a Random Access Response (RAR) UL grant, the UE may use the same RS resource index $q_d$ as for the corresponding PRACH transmission.

In a case that the UE is provided with a configuration of PUSCH power control by the SRI (for example, SRI-PUSCH-PowerControl), and one or more values of the pathloss reference RS ID, the UE may obtain mapping between a set of values for an SRI field in DCI format 0_1 and a set of pathloss reference RS ID values from higher layer signaling (for example, sri-PUSCH-PowerControl-Id in SRI-PUSCH-PowerControl). The UE may determine the RS resource index $q_d$ from the pathloss reference RS ID mapped to the SRI field value in DCI format 0_1 scheduling the PUSCH.

In a case that a PUSCH transmission is scheduled by DCI format 0_0 and the UE is not provided with the PUCCH spatial relation information for the PUCCH resource having the lowest index for the active UL BWP b of each carrier f and serving cell c, the UE may use the RS resource index $q_d$ the same as the PUCCH transmission in the PUCCH resource.

In a case that a PUSCH transmission is scheduled by DCI format 0_0 and the UE is not provided with a spatial setting for a PUCCH transmission, or a PUSCH transmission is scheduled by DCI format 0_1 not including the SRI field, or a configuration of PUSCH power control by the SRI is not provided to the UE, the UE may use the RS resource index $q_d$ having the pathloss reference RS ID equal to zero.

In a case that a configured grant configuration (for example, ConfiguredGrantConfig) includes a given parameter (for example, rrc-CofiguredUplinkGrant) for a PUSCH transmission configured by the configured grant configuration, the RS resource index $q_d$ may be provided to the UE by the pathloss reference index (for example, pathlossReferenceIndex) in the given parameter.

In a case that the configured grant configuration does not include the given parameter for the PUSCH transmission configured by the configured grant configuration, the UE may determine the RS resource index $q_d$ from the pathloss reference RS ID value mapped to the SRI field in the DCI format activating the PUSCH transmission. In a case that the DCI format does not include the SRI field, the UE may determine the RS resource index $q_d$ having the pathloss reference RS ID equal to zero.

Note that Equations (1) and (2) are merely examples, without limitation. So long as the user terminal controls the PUSCH transmission power based on at least one parameter shown as examples in Equations (1) and (2), additional parameters may be included, or some parameters may be omitted. In Equations (1) and (2) described above, the PUSCH transmission power is controlled per active UL BWP of a carrier of a serving cell, without limitation. At least some of the serving cell, the carrier, the BWP, and the power control adjustment state may be omitted.

<PUCCH Transmission Power Control>

In NR, a PUCCH transmission power is controlled based on a TPC command (also referred to as a value, an increase-decrease value, a correction value, an indication value, or the like) indicated by a given field in the DCI (also referred to as a TPC command field, a first field, or the like).

For example, a PUCCH transmission power ($P_{PUCCH,b,f,c}(i, q_u, q_d, l)$) in a PUCCH transmission occasion i (also referred to as transmission duration or the like) on the active UL BWP b of the carrier f of the serving cell c may be expressed by Equation (3) below, using the index l of the power control adjustment state.

The power control adjustment state may be referred to as a PUCCH power control adjustment state, a first or second state, or the like.

The PUCCH transmission occasion i is a given duration in which a PUCCH is transmitted, and may include for example, one or more symbols, one or more slots, and the like.

[Math. 3]

Equation (3)

$$P_{PUCCH,b,f,c}(i, q_v, q_d, l) = \min\begin{Bmatrix} P_{CMAX,f,c}(i), \\ P_{O\_PUCCH,b,f,c}(q_u) + 10\log_{10}(2^\mu \cdot M^{PUSCH}_{RB,b,f,c}(i)) + PL_{b,f,c}(q_d) + \Delta_{F,PUCCH}(F) + \Delta_{TF,b,f,c}(i) + g_{b,f,c}(i, l) \end{Bmatrix}$$

In Equation (3), $P_{CMAX, f, c}(i)$ represents, for example, a transmission power of a user terminal configured for the carrier f of the serving cell c in the transmission occasion i (also referred to as a maximum transmission power, a UE maximum output power, or the like). $P_{O\_PUCCH, b, f, c}(q_u)$ represents, for example, a parameter for a target received power configured for the active UL BWP b of the carrier f of the serving cell c in the transmission occasion i (also referred to as, for example, a parameter for a transmission power offset, a transmission power offset P0, a target received power parameter, or the like).

$M^{PUCCH}_{RB, b, f, c}(i)$ represents, for example, the number of resource blocks (bandwidth) allocated to a PUCCH for the transmission occasion i in the active UL BWP b of the carrier f with the serving cell c and a subcarrier spacing μ. $PL_{b, f, c}(q_d)$ represents, for example, a pathloss calculated by the user terminal using the index $q_d$ of a reference signal for downlink BWP associated with the active UL BWP b of the carrier f of the serving cell c (pathloss reference RS, pathloss measurement DL RS, PUCCH-PathlossReferenceRS).

$\Delta_{F\_PUCCH}$ (F) represents a higher layer parameter given per PUCCH format. $\Delta_{TF, b, f, c}(i)$ represents a transmission power adjustment component for the UL BWP b of the carrier f of the serving cell c (offset).

$g_{b, f, c}(i, l)$ represents a value based on the TPC command having the power control adjustment state index l described above for the active UL BWP of the carrier f of the serving cell c and the transmission occasion i (for example, the power control adjustment state, an accumulated value of the TPC command, a value by a closed loop, or a PUCCH power adjustment state). For example, $g_{b, f, c}(i, l)$ may be expressed by Equation (4).

$$g_{b,f,c}(i,l) = g_{b,f,c}(i_{last}, l) + \delta_{PUCCH,b,f,c}(i_{last}, i, K_{PUCCH}, l)$$

Equation (4)[Math. 4]

In Equation (4), $\delta_{PUCCH, b, f, c}(i_{last}, i, K_{PUCCH}, l)$ may represent, for example, a TPC command indicated by the TPC command field value in the DCI (for example, DCI format 1_0 or 1_1) detected in the active UL BWP b of the carrier f of the serving cell c for the transmission occasion i that is after an immediately before PUCCH transmission occasion $i_{last}$, or a TPC command indicated by the TPC command field value in the DCI (for example, DCI format 2_2) having CRC parity bits scrambled (CRC-scrambled) with a specific Radio Network Temporary Identifier (RNTI) (for example, TPC-PUCCH-RNTI).

In a case that the UE is provided with information indicating that two PUCCH power control adjustment states are used (twoPUCCH-PC-AdjustmentStates) and the PUCCH spatial relation information (PUCCH-SpatialRelationInfo), l may be l={0, 1}, and in a case that the UE is not provided with the information indicating that two PUCCH power control adjustment states are used or the PUCCH spatial relation information, l may be l=0.

In a case that the UE obtains the TPC command value from DCI format 1_0 or 1_1, and the UE is provided with the PUCCH spatial relation information, the UE may obtain mapping between a PUCCH spatial relation information ID (pucch-SpatialRelationInfoId) value and a closed loop index (closedLoopindex, power adjustment state index l) by an index provided by a PUCCH P0 ID (p0-PUCCH-Id in p0-Set in PUCCH-PowerControl in PUCCH-Config). In a case that the UE receives an activation command including the PUCCH spatial relation information ID value, the UE may determine a value of the closed loop index providing a value of l through a link to the corresponding PUCCH P0 ID.

In a case that the UE is provided with a configuration of a $P_{O\_PUCCH, b, f, c}(q_u)$ value for the corresponding PUCCH power adjustment state I on the active UL BWP b of the carrier f of the serving cell c by the higher layer, $g_{b, f, c}(i, l)$ is $g_{b, f, c}(i, l)=0$, k=0, 1, . . . , i. In a case that the UE is provided with the PUCCH spatial relation information, the UE may determine a value of l from a value of $q_u$ based on the PUCCH spatial relation information associated with the PUCCH P0 ID corresponding to $q_u$ and the closed loop index value corresponding to l.

$q_u$ may represent the PUCCH P0 ID (p0-PUCCH-Id) indicating a PUCCH P0 (P0-PUCCH) in a PUCCH P0 set (p0-Set).

Note that Equations (3) and (4) are merely examples, without limitation. So long as the user terminal controls the PUCCH transmission power based on at least one parameter shown as examples in Equations (3) and (4), additional parameters may be included, or some parameters may be omitted. In Equations (3) and (4) described above, the PUCCH transmission power is controlled per active UL BWP of a carrier of a serving cell, without limitation. At least some of the serving cell, the carrier, the BWP, and the power control adjustment state may be omitted.

<SRS Transmission Power Control>

For example, an SRS transmission power ($P_{SRS, b, f, c}(i, q_s, l)$) in an SRS transmission occasion i (also referred to as transmission duration or the like) on the active UL BWP b of the carrier f of the serving cell c may be expressed by Equation (5) below using the index l of the power control adjustment state.

The power control adjustment state may be referred to as an SRS power control adjustment state (PUCCH power control adjustment state), a value based on the TPC command, an accumulated value of the TPC command, a value by a closed loop. a first or second state, or the like. l may be referred to as a closed loop index.

The SRS transmission occasion i is a given duration in which an SRS is transmitted, and may include for example, one or more symbols, one or more slots, and the like.

[Math. 5]

Equation (5)

$$P_{SRS,b,f,c}(i, q_s, l) = \min\begin{cases} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{cases}$$

In Equation (5), $P_{CMAX,f,c}(i)$ represents, for example, a UE maximum output power for the carrier f of the serving cell c in the SRS transmission occasion i. $P_{O\_SRS,b,f,c}(q_s)$ represents a parameter for a target received power provided by p0 for the active UL BWP b of the carrier f of the serving cell c and an SRS resource set $q_s$ (provided by SRS-ResourceSet and SRS-ResourceSetId) (also referred to as, for example, a parameter for a transmission power offset, a transmission power offset P0, a target received power parameter, or the like).

$M_{SRS,b,f,c}(i)$ represents an SRS bandwidth expressed by the number of resource blocks for the SRS transmission occasion i on the active UL BWP b of the carrier f with the serving cell c and a subcarrier spacing μ.

$\alpha_{SRS,b,f,c}(q_s)$ is provided by a (for example, alpha) for the active UL BWP b of the carrier f with the serving cell c and a subcarrier spacing p, and the SRS resource set $q_s$.

$PL_{b,f,c}(qc)$ represents a DL pathloss estimation value [DB] calculated by the UE by using the RS resource index $q_d$ for an active DL BWP of the serving cell c and the SRS resource set $q_s$. The RS resource index $q_d$ represents the pathloss reference RS (pathloss measurement DL RS provided by, for example, pathlossReferenceRS) associated with SRS resource set $q_s$, and is a SS/PBCH block index (for example, ssb-Index) or a CSI-RS resource index (for example, csi-RS-Index).

$h_{b,f,c}(i, l)$ represents the SRS power control adjustment state for the active UL BWP of the carrier f of the serving cell c and the SRS transmission occasion i. In a case that a configuration of the SRS power control adjustment state (for example, srs-PowerControlAdjustmentStates) indicates the same power control adjustment state for an SRS transmission and a PUSCH transmission, it is a current PUSCH power control adjustment state $f_{b,f,c}(i, l)$. On the other hand, in a case that the configuration of the SRS power control adjustment state indicates independent power control adjustment states for an SRS transmission and a PUSCH transmission, and a TPC accumulation configuration is not provided, the SRS power control adjustment state $h_{b,f,c}(i)$ may be expressed by Equation (6).

[Math. 6]

$$h_{b,f,c}(i) = h_{b,f,c}(i-1) + \sum_{m=0}^{o(s_i)-1} \delta_{SRS,b,f,c}(m)$$ Equation (6)

In Equation (6), $\delta_{SRS,b,f,c}(m)$ is coded with another TPC command in a PDCCH having the DCI (for example, DCI format 2_3). $\Sigma\delta_{SRS,b,f,c}(m)$ represents a sum of TPC commands in a set $S_i$ of TPC command values having cardinalities c ($S_i$) received by the UE between $K_{SRS}(i-i_0)-1$ symbols before an SRS transmission occasion $i-i_0$ and $K_{SRS}(i)$ symbols before the SRS transmission occasion i, on the active UL BWP b of the carrier f with the serving cell c and the subcarrier spacing μ. Here, $i_0>0$ represents the smallest integer when $K_{SRS}(i-i_0)-1$ symbols before the SRS transmission occasion $i-i_0$ is earlier than $K_{SRS}(i)$ symbols before the SRS transmission occasion i.

Note that Equations (5) and (6) are merely examples, without limitation. So long as the user terminal controls the SRS transmission power based on at least one parameter shown as examples in Equations (5) and (6), additional parameters may be included, or some parameters may be omitted. In Equations (5) and (6) described above, the SRS transmission power is controlled per BWP of a carrier of a cell, without limitation. At least some of the cell, the carrier, the BWP, and the power control adjustment state may be omitted.

(Power Control Configuration Indication)

In Rel. 15 NR, for following a spatial relation change, switching between a plurality of states of an open loop (OL)-TPC or a closed loop (CL)-TPC can be made by use of the SRI field in the DCI. In a case that the usage of the SRS resource set is a codebook transmission, a maximum value of the SRI field value is 2 (an SRI field length is 1 bit), and in a case that the SRS resource set usage is a non-codebook transmission (nonCodebook), the maximum value of the SRI field value is 4 (the SRI field length is 2 bits).

For configuring the power control configuration for PUSCH, a list of power control configurations (SRI-PUSCH-PowerControl) mapped to the SRI field value (sri-PUSCH-MappingToAddModList) is included in PUSCH power control information (PUSCH-PowerControl) in PUSCH configuration information (PUSCH-Config). The power control configuration includes a power control configuration ID (sri-PUSCH-PowerControlId) corresponding to the SRI field value, a pathloss reference RS ID (sri-PUSCH-PathlossReferenceRS-Id) indicating the pathloss reference RS, a P0-α set ID (sri-P0-PUSCH-AlphaSetId) indicating a set of P0 and a, and a closed loop (CL) ID (sri-PUSCH-ClosedLoopindex) corresponding to a power control state l.

At least one of the pathloss reference RS ID, the P0-α set ID, and the closed loop ID may be referred to as a power control (transmission power control, TPC) parameter. At least one of the pathloss reference RS ID and the P0-α set ID is used for open loop (OL) power control, and thus, may be referred to as an OL power control (TPC) parameter. The closed loop ID is used for closed loop (CL) power control, and thus, may be referred to as a CL power control (TPC) parameter.

For example, as shown in FIG. 1, the SRI field value of 0 may be associated with power control configuration #0 including P0 #0, a #0, pathloss reference RS #0, and power control adjustment state #0 (l=0), and the SRI field value of 1 may be associated with power control configuration #1 including P0 #1, a #1, pathloss reference RS #1, and power control adjustment state #1 (l=1). The UE is indicated with the associated power control configuration by the SRI field.

In a case that the UE is configured with only one SRS resource, the SRI field length is 0 bit.

For configuring the power control configuration for PUCCH, power control configuration (PUCCH-PowerControl) is included in PUCCH configuration information (PUCCH-Config). The power control configuration includes a correction value $\Delta_{F\_PUCCH}(F)$ (deltaF-PUCCH-f0, deltaF-PUCCH-f1, deltaF-PUCCH-f2, deltaF-PUCCH-f3, deltaF-PUCCH-f4) per PUCCH format, a set of P0 (p0-Set), a set of pathloss reference RSs (pathlossReferenceRSs), and information indicating whether to use two PUCCH power adjustment states (twoPUCCH-PC-AdjustmentStates). The pathloss reference RS may be expressed by the SSB index (SSB-Index) or the CSI-RS (NZP-CSI-RS resource ID (NZP-CSI-RS-ResourceId)).

In this way, in Rel. 15 NR, the power control configurations can be switched.

(SRS Configuration)

In Rel. 15 NR, the UE can be configured with one or more SRS resource sets through RRC signaling.

One of codebook transmission, non-codebook transmission (nonCodebook), antenna switching (antennaSwitching), and beam management (beamManagement) may be configured as the usage per SRS resource set. One of an aperiodic (A) SRS, a semi-persistent (SP) SRS, and a periodic (P) SRS may be configured as a type (resourceType) per SRS resource set. Pathloss reference RS (pathlossReferenceRS), a (alpha), and P0 (p0) may be configured per SRS resource set.

In this way, one usage, one type, and one pathloss reference RS can be configured for one SRS resource set.

A plurality of SRS resources may be configured per SRS resource set. One spatial relation may be configured for one SRS resource in some cases.

The SP SRS activation/deactivation MAC CE for activation or deactivation of an SP-SRS (SP SRS) is identified by a MAC subheader having a Logical Channel ID (LCID). The MAC CE has a variable size, and includes fields below as shown in FIG. 2.

An A/D field indicates whether to activate or deactivate an indicated SRS resource set. In a case that this field is set to 1, the field indicates activation, and otherwise indicates deactivation.

A cell ID field of the SRS resource set indicates an identifier of a serving cell including the SP SRS resource set activated or deactivated. This field also indicates the identifier of the serving cell including the all resources indicated by the resource IDs in a case that a C field is 0. A length of this field is 5 bits.

A BWP ID field of the SRS resource set indicates a UL BWP including the SP SRS resource set activated or deactivated, as a codepoint of a BWP indicator field in the DCI. This field also indicates an identifier of a BWP including the all resources indicated by resource $ID_i$ fields in the case that the C field is 0. A length of this field is 2 bits.

The C field indicates whether an octet containing a resource serving cell ID field and a resource BWP ID field is present. In a case that this field is set to 1, the octet containing the resource serving cell ID field and the resource BWP ID field is present, and otherwise such an octet is not present.

A SUL field indicates whether this MAC CE is applied to a normal UL (normal uplink (NUL)) carrier or supplementary UL (supplementary uplink (SUL)) carrier configuration. This field in a case of being set to 1 indicates that the MSC CE is applied to the SUL carrier configuration, and this field in a case of being set to 0 indicates that the MAC CE is applied to the NUL carrier configuration.

A SP SRS resource set ID field, which is an SP SRS resource set ID identified by the SRS resource set ID (SRS-ResourceSetId), indicates an SP SRS resource set ID activated or deactivated.

A $F_i$ field indicates a type of a resource used as the spatial relation for the SRS resource in the SP SRS resource set indicated by using the SP SRS resource set ID field. $F_0$ references the first SRS resource in the resource set, $F_i$ references the second SRS in the resource set, and other $F_i$ reference in the same manner. This field in a case of being set to 1 indicates that the NZP CSI-RS resource index is used, and this field in a case of being set to 0 indicates that either the SSB index or the SRS resource index is used. A length of this field is 1 bit. This field is present only in a case that this MAC CE is used in activation, or the A/D field is set to 1.

A resource $ID_i$ field includes an identifier of a resource used to derive a spatial relation for an SRS resource i. A resource $ID_0$ references the first resource in the resource set, a resource $ID_i$ references the second resource in the resource set, and other resource $ID_i$ reference in the same manner. In a case that $F_i$ is set to 0 and the first bit of this field is set to 0, the rest of this field includes the SRS resource ID (SRS-ResourceId). A length of this field is 7 bits. This field is present only in a case that this MAC CE is used in activation, or the A/D field is set to 1.

A resource serving cell $ID_i$ field indicates an identifier of a serving cell in which the resource used to derive the spatial relation for the SRS resource i is located. A length of this field is 5 bits.

A resource BWP $ID_i$ field indicates a UL BWP in which the resource used to derive the spatial relation for the SRS resource i is located, as a codepoint of the BWP indicator field in the DCI. A length of this field is 2 bits.

An R field is a reserved bit and is set to 0.

The MAC CE in the example in this figure includes M octets containing the $F_i$ field and the resource $ID_i$ field, and M octets containing the resource serving cell $ID_i$ field.

In this way, the UE uses the spatial relation configured for the SP SRS resource activated by the MAC CE or the spatial relation indicated by the MAC CE.

The power control parameter for an SRS (P-SRS, SP-SRS, A-SRS) is configured for the UE through RRC signaling.

Figure 3:
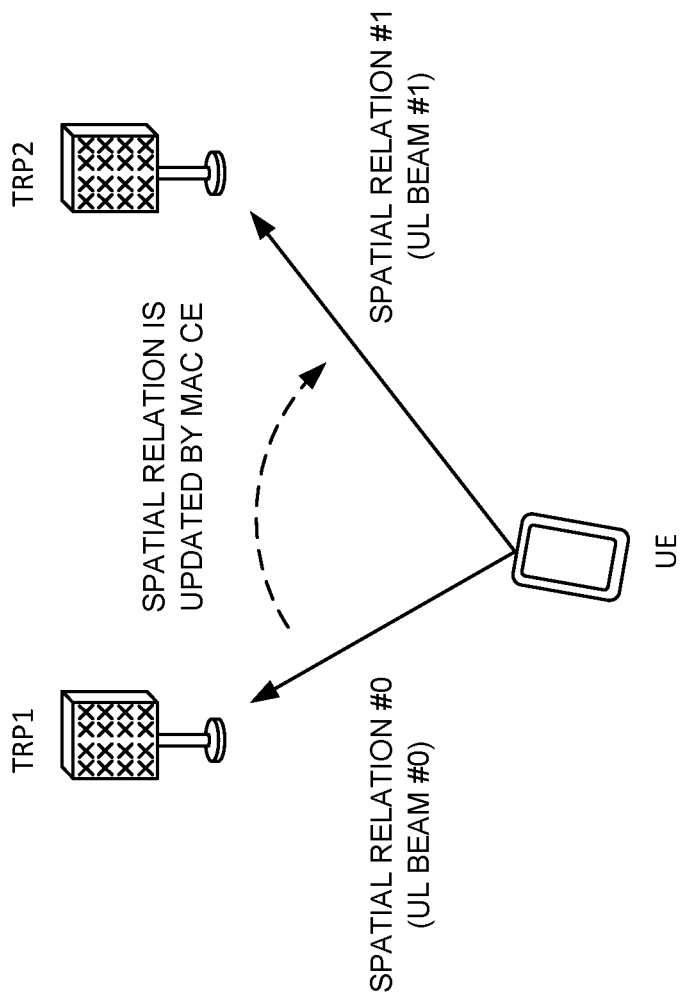
FIG. 3 is a diagram to show an example of update of a spatial relation.

On the other hand, a study is underway that a spatial relation for an A-SRS (UL transmit beam) is updated by the MAC CE. For example, as shown in FIG. 3, the UL transmit beam is updated by the MAC CE from UL transmit beam #0 for the TRP 1 to UL transmit beam #1 for the TRP 2.

In the case that the spatial relation is updated, the transmission power is desirably updated as well. Not only in a case that the UL transmit beam for a plurality of TRPs is changed but also in a case that the UL transmit beam for a single TRP is changed, a path changes, and thus, the pathloss also changes.

However, in the case that spatial relation is updated, it is conceivable that the transmission power is failed to be appropriately updated. For example, the number of pathloss reference RSs is limited to four per serving cell for all transmissions of PUSCH and PUCCH and SRS. On the other hand, in a case that the UL transmit beam is managed by using the SRS, and that the UL transmit beam is managed by using the DL RS (SSB or CSI-RS) by the beam correspondence, the number of UL transmit beams (or the number of DL RSs) may exceed four. Unless the power control parameter such as the pathloss reference RS is appropriately updated in the case that the spatial relation is updated, the UL transmission is not appropriately performed and the system performance may be deteriorated.

As such, the inventors of the present invention came up with a method for updating the parameters for the power control.

Hereinafter, embodiments according to the present disclosure will be described in detail with reference to the drawings. The radio communication methods according to respective embodiments may each be employed individually, or may be employed in combination.

In the present disclosure, the spatial relation may be interpreted as spatial relation information, spatial relation assumption, spatial domain transmission filter, UE spatial domain transmission filter, spatial domain filter, UE transmit beam, UL transmit beam, DL-RS, QCL assumption, SRI, spatial relation based on SRI, or the like.

The TCI state may be interpreted as TCI state or QCL assumption, QCL assumption, spatial domain reception filter, UE spatial domain reception filter, spatial domain filter, UE receive beam, DL receive beam, DL-RS, or the like. The QCL type D RS, DL-RS associated with the QCL type D, DL-RS having the QCL type D, source of DL-RS, SSB, and CSI-RS may be interchangeably interpreted.

In the present disclosure, the TCI state may be information related to a receive beam (spatial domain reception filter) indicated (configured) for the UE (for example, DL-RS, QCL type, cell in which DL-RS is transmitted, or the like). The QCL assumption may be information related to a receive beam (spatial domain reception filter) assumed by the UE based on transmission or reception of an associated signal (for example, PRACH) (for example, DL-RS, QCL type, cell in which DL-RS is transmitted, or the like).

In the present disclosure, the TRP, the panel, the TRP ID, the panel ID, a CORESET group ID for a PDCCH CORESET from the TRP or the panel, a CORESET ID indicating the PDCCH CORESET from the TRP or the panel, and another index corresponding to the TRP or the panel (DMRS port group ID, or the like) may be interchangeably interpreted.

In the present disclosure, the SRS may be interpreted as at least one of an A-SRS, a P-SRS, and an SP-SRS.

In the present disclosure, the pathloss reference RS, a PUSCH pathloss reference RS, a PUCCH pathloss reference RS, and an SRS pathloss reference RS may be interchangeably interpreted.

In the present disclosure, A/B may be interpreted as A or B, A and B, and at least one A and B.

(Radio Communication Method)

First Embodiment

The power control parameter for an SRS may be updated (activated, deactivated, changed, or indicated) by the MAC CE. The power control parameter may be at least one of the pathloss reference RS, α, P0, and the power control adjustment state.

The SRS pathloss reference RS may be updated by the MAC CE.

The UE may be configured with more than four pathloss reference RSs. The RS which the UE simultaneously uses to calculate the pathloss may be referred to an active pathloss reference RS.

The UE may be configured with (restricted in) the number of active pathloss reference RSs by the number of active pathloss reference RSs (maximum number) configured as a new RRC parameter.

The UE may be configured with (restricted in) the number of active pathloss reference RSs (maximum number) by an RRC parameter in Rel. 15 (for example, PUSCH pathloss reference RS maximum number (maxNrofPUSCH-PathlossReferenceRSs) or PUCCH pathloss reference RS maximum number (maxNrofPUCCH-PathlossReferenceRSs)). In other words, the UE may interpret the RRC parameter in Rel. 15 as the number of active pathloss reference RSs (maximum number).

The UE may report the number of active pathloss reference RSs (maximum number) as the UE capability information. The UE may be configured with or activated in the active pathloss reference RSs up to the reported number of active pathloss reference RSs.

A plurality of values of the SRS spatial relation may be configured for the UE through higher layer signaling, and one of the plurality of values may be activated by the MAC CE. In response to the activation of the SRS spatial relation, the power control parameter may be activated by the MAC CE.

The UE may be configured with the power control parameter by at least one of power control parameter configuration information 1 to 6.

<<Power Control Parameter Configuration Information 1>>

The UE may be configured with a plurality of values of the power control parameter per SRS resource set.

The SRS resource set information (for example, SRS-ResourceSet) may include a set of one or more values of the power control parameter, or a set of two or more values of the power control parameter. The set of values of the power control parameter may be at least one of an a set (for example, alpha-Set), a P0 set (for example, p0-Set), a pathloss reference RS set (for example, srs-pathlossReferenceRSs), and a power control adjustment state set (for example, srs-PowerControlAdjustmentStates-Set).

As shown in FIG. 4, the SRS resource set information may include at least one of a (for example, alpha), P0 (for example, p0), the pathloss reference RS (for example, pathlossReferenceRS), and the power control adjustment state (for example, srs-PowerControlAdjustmentStates) for compatibility with Rel. 15.

As shown in FIG. 4, the SRS resource set information may include, for example, an a set, a P0 set, and a pathloss reference RS set.

According to this power control parameter configuration information, a plurality of values of the power control parameter can be configured to one SRS resource set.

<<Power Control Parameter Configuration Information 2>>

The UE may be configured with a plurality of values of the power control parameter per SRS resource set.

The SRS resource set information (for example, SRS-ResourceSet) may include update information of a list of values of the power control parameter (power control parameter list). The update information may be at least one of an addition list for adding or modifying one or more value of the power control parameter with respect to the power control parameter list, and a release list for releasing one or more values of the power control parameter from the power control parameter list.

The addition list for the power control parameter may be at least one of an a addition list (for example, alphaToAddModList), a P0 addition list (for example, p0ToAddModList), a pathloss reference RS addition list (for example, srs-pathlossReferenceRSToAddModList), and a power control adjustment state addition list (for example, srs-PowerControlAdjustmentStatesToAddModList). The release list for the power control parameter may be at least one an a release list (for example, alphaToReleaseList), a P0 release list (for example, p0ToReleaseList), a pathloss reference RS release list (for example, srs-pathlossReferenceRSToReleaseList), and a power control adjustment state release list (for example, srs-PowerControlAdjustmentStatesToReleaseList).

As shown in FIG. 5, the SRS resource set information may include at least one of a (for example, alpha), P0 (for example, p0), the pathloss reference RS (for example, pathlossReferenceRS), and the power control adjustment state (for example, srs-PowerControlAdjustmentStates) for compatibility with Rel. 15.

As shown in FIG. 5, the SRS resource set information may include, for example, an a set, a P0 set, a pathloss reference RS addition list (for example, pathlossReferenceRSToAddModList), and a pathloss reference RS release list (for example, srs-pathlossReferenceRSToReleaseList).

A minimum number of the pathloss reference RS in the pathloss reference RS addition list is 1 in this example, but the minimum number of the pathloss reference RS in the pathloss reference RS addition list may be 2. In a case that the UE is configured with one pathloss reference RS, one pathloss reference RS may be configured without using the addition list.

According to this power control parameter configuration information, a plurality of values of the power control parameter can be configured to one SRS resource set. Among a plurality of configurable UL transmit beams (spatial relations), some UL transmit beams to be probably used may be configured for the UE, allowing signaling overhead to be suppressed.

A UE behavior in case that the UE supports either the power control parameter configuration information 1 or 2 will be described.

In the case that the UE is configured with one value of the power control parameter per SRS resource set, the UE may be configured with one value of the power control parameter in the SRS resource set, or a set or list of size 1 (or containing one value) of the power control parameter in the SRS resource set.

In the case that the UE is configured with one value of the power control parameter per SRS resource set, the UE may assume that the UE is configured with one value of the power control parameter in the SRS resource set, or that the UE is not configured with a set or list of size 1 (or containing one value) of the power control parameter in the SRS resource set.

The UE configured with one value of the power control parameter may, similar to Rel. 15 NR, assume one value of the power control parameter per one SRS resource set to receive the activation/deactivation MAC CE for one value of the power control parameter.

The UE configured with the set or list of the power control parameter may assume more than one value of the power control parameter per one SRS resource set to receive the activation/deactivation MAC CE for more than one value of the power control parameter.

In the case, like the power control parameter configuration information 1, 2, 4, and 5, that the SRS resource set information or the SRS resource information includes a plurality of values of the power control parameter, the ID and value of the power control parameter may be defined.

For example, at least one of SRS pathloss reference RS information indicating the ID and value of the pathloss reference RS (for example, SRS-PathlossReferenceRS), SRS α information indicating the ID and value of a (for example, Alpha-SRS), SRS P0 information indicating the ID and value of P0 (for example, P0-SRS), and SRS power control adjustment state information indicating the ID and value of the power control adjustment state (for example, SRS-PowerControlAdjustmentStates) may be defined.

As shown in FIG. 6, the SRS pathloss reference RS information may include the pathloss reference RS ID and an index of a RS used as the pathloss reference RS. An index of an RS may be the SSB index or the CSI-RS resource index. The SRS α information may include the a ID and an a value. The SRS P0 information may include the P0 ID and a P0 value.

In a case that a plurality of values of the power control parameter are configured through RRC signaling in accordance with such a definition, an ID of the power control parameter to be activated can be indicated by the MAC CE.

<<Power Control Parameter Configuration Information 3>>

The UE may be configured with one value of the power control parameter per SRS resource.

The SRS resource information (for example, SRS-Resource) may include one value of at least one power control parameter.

As shown in FIG. 7, the SRS resource information may include, for example, α (for example, alpha), P0 (for example, p0), the pathloss reference RS (for example, pathlossReferenceRS), and the power control adjustment state (for example, srs-PowerControlAdjustmentStates).

In a case that an SRS resource is activated by the MAC CE, the UE may apply the power control parameter in the SRS resource. In other words, the power control parameter is updated in response to the update of the SRS resource. Therefore, signaling overhead for the power control parameter update (activation) can be suppressed.

<<Power Control Parameter Configuration Information 4>>

The UE may be configured with a plurality of values of the power control parameter per SRS resource.

The SRS resource information (for example, SRS-Resource) may include a set of one or more values of the power control parameter, or a set of two more values of the power control parameter. The set of values of the power control parameter may be at least one of an a set (for example, alpha-Set), a P0 set (for example, p0-Set), a pathloss reference RS set (for example, srs-pathlossReferenceRSs), and a power control adjustment state set (for example, srs-PowerControlAdjustmentStates-Set).

As shown in FIG. 8, the SRS resource information may include, for example, an a set (for example, alpha-Set), a P0 set (for example, p0-Set), and a pathloss reference RS set (for example, srs-PathlossReferenceRSs).

According to this power control parameter configuration information, a plurality of values of the power control parameter can be configured to one SRS resource.

<<Power Control Parameter Configuration Information 5>>

The UE may be configured with a plurality of values of the power control parameter per SRS resource.

The SRS resource information (for example, SRS-Resource) may include update information of a list of values of the power control parameter (power control parameter list). The update information may be at least one of an addition list for adding or modifying one or more values of the power control parameter with respect to the power control parameter list, and a release list for releasing one or more values of the power control parameter from the power control parameter list.

As shown in FIG. 9, the SRS resource information may include, for example, an a set (for example, alpha-Set), a P0 set (for example, p0-Set), a pathloss reference RS addition list (for example, pathlossReferenceRSToAddModList), and a pathloss reference RS release list (for example, srs-pathlossReferenceRSToReleaseList).

A minimum number of the pathloss reference RS in the pathloss reference RS addition list is 1 in this example, but the minimum number of the pathloss reference RS in the pathloss reference RS addition list may be 2. In a case that the UE is configured with one pathloss reference RS, one pathloss reference RS may be configured without using the addition list.

According to this power control parameter configuration information, a plurality of values of the power control parameter can be configured to one SRS resource. Among a plurality of configurable UL transmit beams (spatial relations), some UL transmit beams to be probably used may be configured for the UE, allowing signaling overhead to be suppressed.

A UE behavior in case that the UE supports either the power control parameter configuration information 4 or 5 will be described.

In a case that a plurality (set or list) of values of the power control parameter to one SRS resource are configured for the UE, the SRS resource may be activated by the MAC CE and the power control parameter in the activated SRS resource may be activated by the MAC CE. The power control parameter in the SRS resource may be activated by a MAC CE different from the MAC CE activating the SRS resource, or may be activated by the MAC CE activating the SRS resource.

In the case that the UE is configured with one value of the power control parameter per SRS resource, the UE may be configured with one value of the power control parameter in the SRS resource, or a set or list of size 1 (or containing one value) of the power control parameter in the SRS resource.

In the case that the UE is configured with one value of the power control parameter per SRS resource, the UE may assume that the UE is configured with one value of the power control parameter in the SRS resource, or that the UE is not configured with a set or list of size 1 (or containing one value) of the power control parameter in the SRS resource.

The UE configured with one value of the power control parameter may, similar to Rel. 15 NR, assume one value of the power control parameter per one SRS resource to receive the activation/deactivation MAC CE for one value of the power control parameter.

The UE configured with the set or list of the power control parameter may assume more than one value of the power control parameter per one SRS resource set to receive the activation/deactivation MAC CE for more than one value of the power control parameter.

<<Power Control Parameter Configuration Information 6>>

The UE may be configured with one value of the power control parameter per SRS spatial relation.

The SRS spatial relation may be configured by SRS spatial relation information (for example, spatialRelationInfo, SRS-SpatialRelationInfo) in the SRS resource information (for example, SRS-Resource). The SRS spatial relation information may include one value of at least one power control parameter.

As shown in FIG. 10, the SRS spatial relation information may include, for example, a (for example, alpha), P0 (for example, p0), the pathloss reference RS (for example, pathlossReferenceRS), and the power control adjustment state (for example, srs-PowerControlAdjustmentStates).

A plurality of values of the SRS spatial relation may be configured for the UE through higher layer signaling, and one of the plurality of values may be activated by the MAC CE. In a case that an SRS spatial relation is activated by the MAC CE, the UE may apply the power control parameter in the SRS spatial relation. In other words, the power control parameter is updated in response to the update of the SRS spatial relation.

The indication of the update of the power control parameter except for the MAC CE activating the SRS spatial relation is not needed to be notified to the UE, allowing the signaling overhead to be suppressed.

In a case that the UE supports any of the power control parameter configuration information 3 to 5, the UE may determine the power control parameter using any of power control parameter determination methods 1-1 to 1-4 as described below.

[Power Control Parameter Determination Method 1-1]

In a case that the power control parameter is configured for the UE in accordance with the SRS resource information, the UE may assume that the power control parameter is not configured for the UE in accordance with the SRS resource set information.

[Power Control Parameter Determination Method 1-2]

In a case that the power control parameter is configured for the UE in accordance with the SRS resource information and the power control parameter is configured for the UE in accordance with the SRS resource set information, the UE may use the power control parameter configured in accordance with the SRS resource information. Using the power control parameter configured per SRS resource allows the power control parameter to be flexibly configured, and accuracy of the power control parameter to be improved.

[Power Control Parameter Determination Method 1-3]

In a case that the power control parameter is configured for the UE in accordance with the SRS resource information and the power control parameter is configured for the UE in accordance with the SRS resource set information, the UE may use the power control parameter configured in accordance with the SRS resource set information. The UE is simplified in terms of the operation by performing operations the same as in Rel. 15 NR.

[Power Control Parameter Determination Method 1-4]

In the case that the power control parameter is configured for the UE in accordance with the SRS resource information and the power control parameter is configured for the UE in accordance with the SRS resource set information, the UE may use the power control parameter in the information activated by the MAC CE of the SRS resource information and the SRS resource set information. The power control parameter complying with the latest indication allows the accuracy to be improved.

In a case that the UE supports the power control parameter configuration information 6, the UE may determine the power control parameter using any of power control parameter determination methods 2-1 to 2-4 as described below.

[Power Control Parameter Determination Method 2-1]

In a case that the power control parameter is configured for the UE in accordance with the SRS spatial relation information, the UE may assume that the power control parameter is not configured for the UE in accordance with the SRS resource set information.

[Power Control Parameter Determination Method 2-2]

In a case that the power control parameter is configured for the UE in accordance with the SRS spatial relation information and the power control parameter is configured for the UE in accordance with the SRS resource set information, the UE may use the power control parameter configured in accordance with the SRS spatial relation information. Using the power control parameter configured per SRS resource allows the power control parameter to be flexibly configured, and the accuracy of the power control parameter to be improved.

[Power Control Parameter Determination Method 2-3]

In the case that the power control parameter is configured for the UE in accordance with the SRS spatial relation information and the power control parameter is configured for the UE in accordance with the SRS resource set information, the UE may use the power control parameter configured in accordance with the SRS resource set information. The UE is simplified in terms of the operation by performing operations the same as in Rel. 15 NR.

[Power Control Parameter Determination Method 2-4]

In the case that the power control parameter is configured for the UE in accordance with the SRS spatial relation information and the power control parameter is configured for the UE in accordance with the SRS resource set information, the UE may use the power control parameter in the information activated by the MAC CE of the SRS spatial relation information and the SRS resource set information. The power control parameter complying with the latest indication allows the accuracy to be improved.

According to this embodiment, the update (activation) of the power control parameter can be performed in response to the update (activation) of the SRS spatial relation to apply the power control parameter suitable for the spatial relation (UL transmit beam) to the SRS transmission.

Second Embodiment

The UE may receive the MAC CE for the activation or deactivation of the power control parameter (activation MAC CE).

At least one of MAC CEs 1 to 4 below may be used as the activation MAC CE for the power control parameter.

<<MAC CE 1>>

The MAC CE may activate one value of the power control parameter per SRS resource set.

Figure 11:
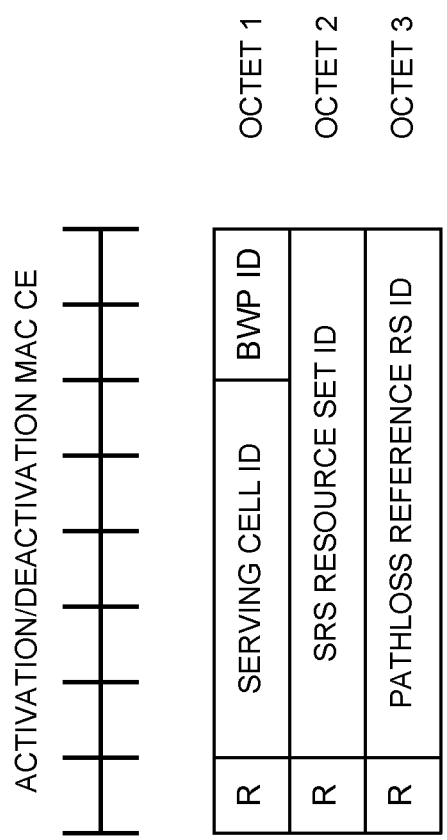
FIG. 11 is a diagram to show an example of a pathloss reference RS activation MAC CE 1.

In a case that the power control parameter is the pathloss reference RS, for example, as shown in FIG. 11, the activation MAC CE for the spatial relation may include at least one field of the serving cell ID, the BWP ID, the SRS resource set ID, the pathloss reference RS ID, and the reserved bit.

The serving cell ID field may indicate an identifier of the serving cell to which the MAC CE is applied. A length of this field may be 5 bits.

The BWP ID field may indicate the UL BWP to which the MAC CE is applied, as a codepoint of the BWP indicator field in the DCI. A length of this field may be 2 bits.

The SRS resource set ID field may indicate the SRS resource set ID (for example, SRS-ResourceSetId) to be activate or deactivated. A length of this field may be 4 bits.

The pathloss reference RS ID field may include an identifier of one active pathloss reference RS identified by the pathloss reference RS ID (for example, SRS-PathlossReferenceRS-Id). A length of this field may be x bit(s).

x may represent a fixed value defined by a specification, or a value determined depending on the number of pieces of the SRS spatial relation information (SRS-SpatialRelation-Info).

The reserved bit (R) field may be set to 0.

In a case that a plurality of pathloss reference RSs are configured for the UE per SRS resource set in accordance with either the power control parameter configuration information 1 or 2 described above, up to one pathloss reference RS at a time may be active for one SRS resource set. One MAC CE may activate one pathloss reference RS.

The UE may use the active pathloss reference RS to measure a pathloss for SRS.

<<MAC CE 2>>

The MAC CE may activate one or more values of the power control parameter per SRS resource set.

Figure 12:
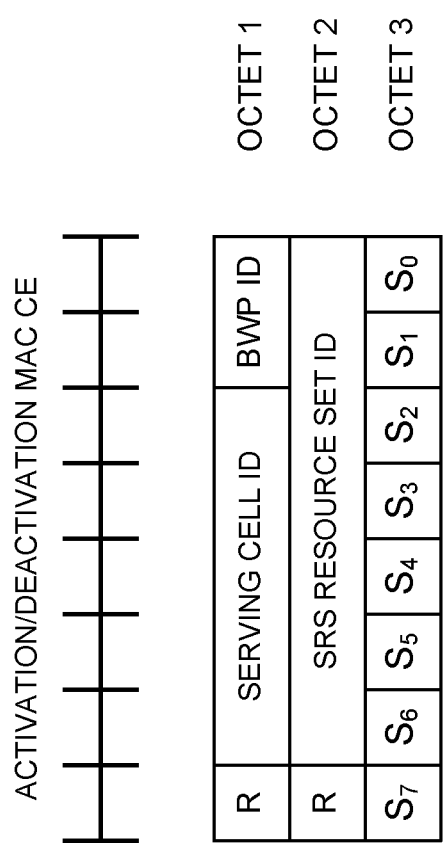
FIG. 12 is a diagram to show an example of a pathloss reference RS activation MAC CE 2.

In the case that the power control parameter is the pathloss reference RS, for example, as shown in FIG. 12, the activation MAC CE for the PUSCH pathloss reference RS may include at least one field of the serving cell ID, the BWP ID, the SRS resource set ID, $S_i$, and the reserved bit.

The serving cell ID field may indicate an identifier of the serving cell to which the MAC CE is applied. A length of this field may be 5 bits.

The BWP ID field may indicate the UL BWP to which the MAC CE is applied, as a codepoint of the BWP indicator field in the DCI. A length of this field may be 2 bits.

The SRS resource set ID field may indicate the SRS resource set ID (for example, SRS-ResourceSetId) to be activate or deactivated. A length of this field may be 4 bits.

In a case that the pathloss reference RS having the pathloss reference RS ID (SRS-PathlossReferenceRS-Id) i configured for the UL BWP indicated by the BWP ID field (or the SRS resource set indicated by the SRS resource set ID field) is present, the $S_i$ field indicates an activation state of the pathloss reference RS having the pathloss reference RS ID i, and otherwise, a MAC entity may ignore this field. The $S_i$ field is set to 1 to indicate that the pathloss reference RS having the pathloss reference RS ID i is activated. The $S_i$ field is set to 0 to indicate that the pathloss reference RS having the pathloss reference RS ID i is deactivated.

The number of $S_i$ fields may be defined by a specification, or the number of active pathloss reference RSs configured through RRC signaling.

The reserved bit (R) field may be set to 0.

In the case that a plurality of pathloss reference RSs are configured for the UE per SRS resource set in accordance with either the power control parameter configuration information 1 or 2 described above, up to one pathloss reference RS at a time may be active for one SRS resource set. One MAC CE may activate one pathloss reference RS. The UE may use the active pathloss reference RS to measure (estimate) a pathloss for SRS.

In the case that a plurality of pathloss reference RSs are configured for the UE per SRS resource set in accordance with either the power control parameter configuration information 1 or 2 described above, up to N pathloss reference RSs at a time may be active for one SRS resource set. One MAC CE may activate a plurality of pathloss reference RSs.

N active pathloss reference RSs may be associated with N SRS resources or N SRS spatial relations, respectively. In a case that one SRS resource or one SRS spatial relation is indicated (activated) by the MAC CE or the DCI, the UE may use the active pathloss reference RS corresponding to the indicated SRS resource or the indicated SRS spatial relation to measure (estimate) a pathloss for SRS.

<<MAC CE 3>>

The MAC CE may activate one value of the power control parameter per SRS resource.

Figure 13:
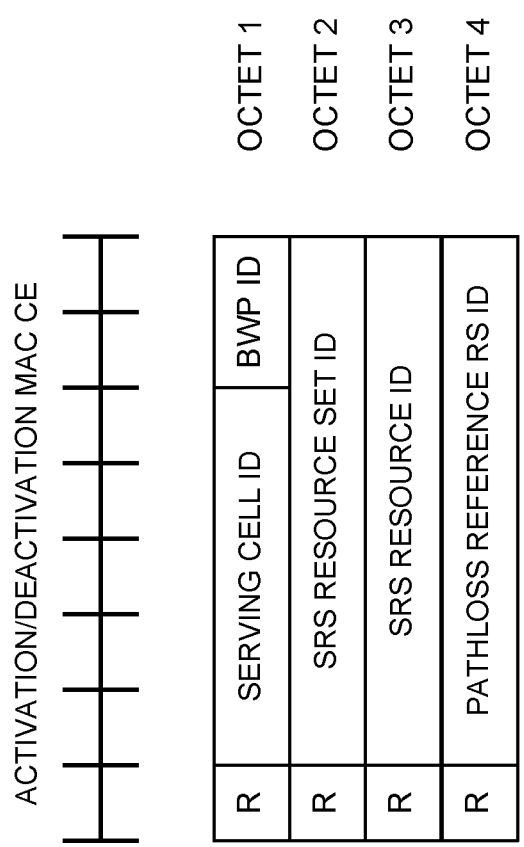
FIG. 13 is a diagram to show an example of a pathloss reference RS activation MAC CE 3.

In the case that the power control parameter is the pathloss reference RS, for example, as shown in FIG. 13, the activation MAC CE for the spatial relation may include at least one field of the serving cell ID, the BWP ID, the SRS resource set ID, the SRS resource ID, the pathloss reference RS ID, and the reserved bit.

The serving cell ID field may indicate an identifier of the serving cell to which the MAC CE is applied. A length of this field may be 5 bits.

The BWP ID field may indicate the UL BWP to which the MAC CE is applied, as a codepoint of the BWP indicator field in the DCI. A length of this field may be 2 bits.

The SRS resource set ID field may indicate the SRS resource set ID (for example, SRS-ResourceSetId) to be activate or deactivated. A length of this field may be 4 bits.

The SRS resource ID field may include an identifier of a resource used to derive a spatial relation for the SRS resource i to be activated.

The pathloss reference RS ID field may include an identifier of one active pathloss reference RS identified by the pathloss reference RS ID (for example, SRS-Pathloss-ReferenceRS-Id). A length of this field may be x bit(s).

x may represent a fixed value defined by a specification, or a value determined depending on the number of pieces of the SRS spatial relation information (SRS-SpatialRelation-Info).

The reserved bit (R) field may be set to 0.

In a case that a plurality of pathloss reference RSs are configured for the UE per SRS resource in accordance with either the power control parameter configuration information 4 or 5 described above, up to one pathloss reference RS at a time may be active for one SRS resource. One MAC CE may activate one pathloss reference RS.

The UE may use the active pathloss reference RS to measure a pathloss for SRS.

<<MAC CE 4>>

The MAC CE may activate one or more values of the power control parameter per SRS resource.

Figure 14:
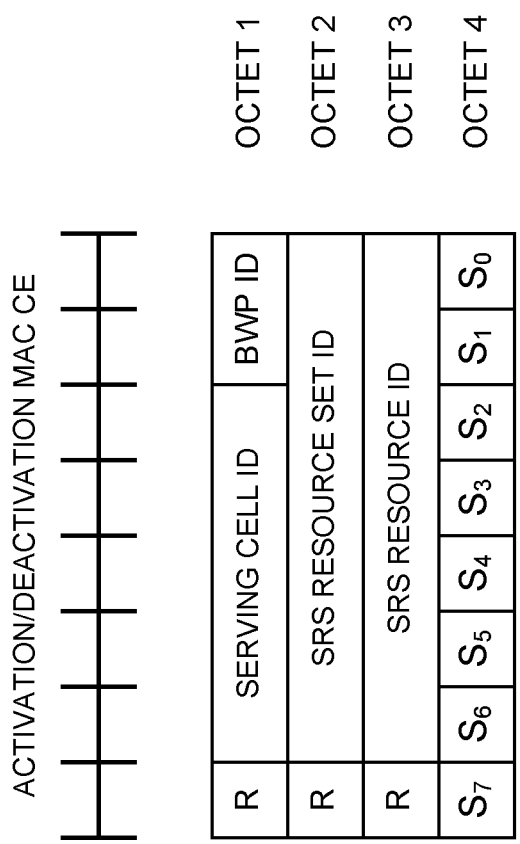
FIG. 14 is a diagram to show an example of a pathloss reference RS activation MAC CE 4.

In the case that power control parameter is the pathloss reference RS, for example, as shown in FIG. 14, the activation MAC CE for the PUSCH pathloss reference RS may include at least one field of the serving cell ID, the BWP ID, the SRS resource set ID, the SRS resource ID, $S_i$, and the reserved bit.

The serving cell ID field may indicate an identifier of the serving cell to which the MAC CE is applied. A length of this field may be 5 bits.

The BWP ID field may indicate the UL BWP to which the MAC CE is applied, as a codepoint of the BWP indicator field in the DCI. A length of this field may be 2 bits.

The SRS resource set ID field may indicate the SRS resource set ID (for example, SRS-ResourceSetId) to be activate or deactivated. A length of this field may be 4 bits.

The SRS resource ID field may include an identifier of a resource used to derive a spatial relation for the SRS resource i to be activated.

In a case that the pathloss reference RS having the pathloss reference RS ID (SRS-PathlossReferenceRS-Id) i configured for the UL BWP indicated by the BWP ID field (or the SRS resource indicated by the SRS resource ID field) is present, the $S_i$ field indicates an activation state of the pathloss reference RS having the pathloss reference RS ID i, and otherwise, a MAC entity may ignore this field. The $S_i$ field is set to 1 to indicate that the pathloss reference RS having the pathloss reference RS ID i is activated. The $S_i$ field is set to 0 to indicate that the pathloss reference RS having the pathloss reference RS ID i is deactivated.

The number of $S_i$ fields may be defined by a specification, or the number of active pathloss reference RSs configured through RRC signaling.

The reserved bit (R) field may be set to 0.

In a case that a plurality of pathloss reference RSs are configured for the UE per SRS resource in accordance with either the power control parameter configuration information 4 or 5 described above, up to one pathloss reference RS at a time may be active for one SRS resource. One MAC CE may activate one pathloss reference RS. The UE may use the active pathloss reference RS to measure (estimate) a pathloss for SRS.

In the case that a plurality of pathloss reference RSs are configured for the UE per SRS resource in accordance with either the power control parameter configuration information 4 or 5 described above, up to N pathloss reference RSs at a time may be active for one SRS resource. One MAC CE may activate a plurality of pathloss reference RSs.

N active pathloss reference RSs may be associated with N SRS spatial relations, respectively. In a case that one SRS spatial relation is indicated (activated) by the MAC CE or the DCI, the UE may use the active pathloss reference RS corresponding to the indicated SRS spatial relation to measure (estimate) a pathloss for SRS.

According to this embodiment, the number of candidates for the pathloss reference RS can be increased as compared to Rel. 15 NR. For example, the number of candidates for the pathloss reference RS can be applied as the power control parameter suitable for the number of candidates for the spatial relation (for example, the number of SSBs or the like) to the SRS transmission.

Third Embodiment

The UE may determine the power control adjustment state based on a specific indication. The specific indication may indicate at least one of the power control adjustment state, the SRS resource set, the SRS resource, and the pathloss reference RS. The power control adjustment state may be the SRS power control adjustment state $h_{b, f, c}(i, l)$.

The number of power control adjustment states that the UE can calculate or hold may depend on the UE capability. The UE may report the number of power control adjustment states that the UE can calculate or hold as the UE capability information. The UE may be configured with the power control adjustment states number of which is equal to or less than the reported number.

In a case that at least one condition of state update conditions 1 to 4 described below is met, the UE may determine power control adjustment state based on the specific indication.

<<State Update Condition 1>>

The condition may be that a spatial relation for an SRS resource is configured or indicated as the spatial relation for at least one of PUSCH and PUCCH. The UE may be indicated with the spatial relation by the SRI field. The condition may be that a spatial relation for a plurality of SRS resources is configured as the spatial relation for at least one of PUSCH and PUCCH, and a spatial relation for one of the plurality of SRS resources is indicated or activated by the MAC CE.

<<State Update Condition 2>>

The condition may be that the SRS resource configured or indicated for the spatial relation for at least one of PUSCH and PUCCH is updated by the MAC CE. The UE may be indicated with the spatial relation by the SRI field. The condition may be that the SRS resource in the SRS resource set having the usage of codebook transmission or non-codebook transmission (nonCodebook) configured for the PUSCH is updated by the MAC CE.

<<State Update Condition 3>>

The condition may be that the spatial relation currently used for at least one of PUSCH, PUCCH, and SRS is updated by the MAC CE. The UE may be indicated with the spatial relation by the SRI field. The condition may be that the spatial relation used for the last transmission of at least one of PUSCH, PUCCH, and SRS may be updated by the MAC CE.

<<State Update Condition 4>>

The condition may be that the pathloss reference RS for at least one of PUSCH, PUCCH, and SRS is updated by the MAC CE.

The UE may determine the power control adjustment state in accordance with at least one of state update methods 1 to 4 described below.

<<State Update Method 1>>

The UE calculates or holds a plurality of power control adjustment states corresponding to a plurality of IDs (or indices), and in a case that one of the plurality of IDs is activated by the MAC CE, the UE may apply the active power control adjustment state to the SRS.

One MAC CE may activate one power control adjustment state. The UE may apply the active power control adjustment state to the closed loop transmission power control.

For example, as shown in FIG. 15, in a case that the UE is configured with four IDs through RRC signaling and receives a MAC CE indicating activation of ID #1, the UE may apply a power control adjustment state of the power control adjustment state ID #1 to the closed loop transmission power control (CL-TPC).

In a case that at least one condition of the state update conditions 1 to 4 described above is met and one of the plurality of IDs is activated by the MAC CE, the UE may apply the active power control adjustment state to the SRS.

The UE may not be required to calculate or hold the deactive power control adjustment state (TPC command accumulation). In other words, the UE may calculate or hold only the active power control adjustment state.

The UE may calculate or hold the active power control adjustment state and the deactive power control adjustment state.

<<State Update Method 2>>

The UE calculates or holds a plurality of power control adjustment states corresponding to a plurality of SRS resource sets or a plurality of SRS resources, and that a spatial relation for an SRS is updated by the MAC CE, the UE may apply the power control adjustment state corresponding to the spatial relation to the SRS.

One MAC CE may activate one SRS resource set or one SRS resource. The UE may apply the power control adjustment state corresponding to the active SRS resource set or the active SRS resource to the closed loop transmission power control.

For example, as shown in FIG. 16, in a case that the UE is configured with four A-SRS resources through RRC signaling and receives a MAC CE indicating an activation of A-SRS resource ID #1, the UE may apply a power control adjustment state corresponding to A-SRS resource ID #1 to the closed loop transmission power control (CL-TPC).

In a case that at least one of the state update conditions 1 to 4 described above is met and the spatial relation is updated by the MAC CE, the UE may apply a power control adjustment state corresponding to the spatial relation to at least one of PUSCH and PUCCH.

<<State Update Method 3>>

The UE calculates or holds a plurality of power control adjustment states corresponding to a plurality of pathloss reference RSs for at least one of PUSCH and PUCCH, and in a case that the pathloss reference RS is updated by the MAC CE, the UE may apply a power control adjustment state corresponding to the pathloss reference RS to at least one of PUSCH and PUCCH. The pathloss reference RS may be a pathloss reference RS configured for at least one of PUSCH and PUCCH. The power control adjustment state may be at least one of the PUSCH power control adjustment state $f_{b,f,c}(i, 1)$ and the PUCCH power control adjustment state $g_{b,f,c}(i, 1)$.

For example, as shown in FIG. 17, in a case that the UE is configured with four pathloss reference RSs through RRC signaling and receives a MAC CE indicating an activation of pathloss reference RS ID #1, the UE may apply a power control adjustment state corresponding to pathloss reference RS ID #1 to the closed loop transmission power control (CL-TPC).

In a case that at least one of the state update conditions 1 to 4 described above is met and the pathloss reference RS is updated by the MAC CE, the UE may apply a power control adjustment state corresponding to the pathloss reference RS to at least one of PUSCH and PUCCH.

According to this embodiment, the UE can determine the appropriate power control adjustment state based on the MAC CE, and can determine the appropriate transmission power.

Other Embodiments

Similar to the SP-SRS in Rel. 15, at least one SRS resource of a P-SRS and an A-SRS may be updated (activated, deactivated, or indicated) by the MAC CE. The SRS according to the embodiments described above may be an A-SRS, a P-SRS, or an SP-SRS.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 18:
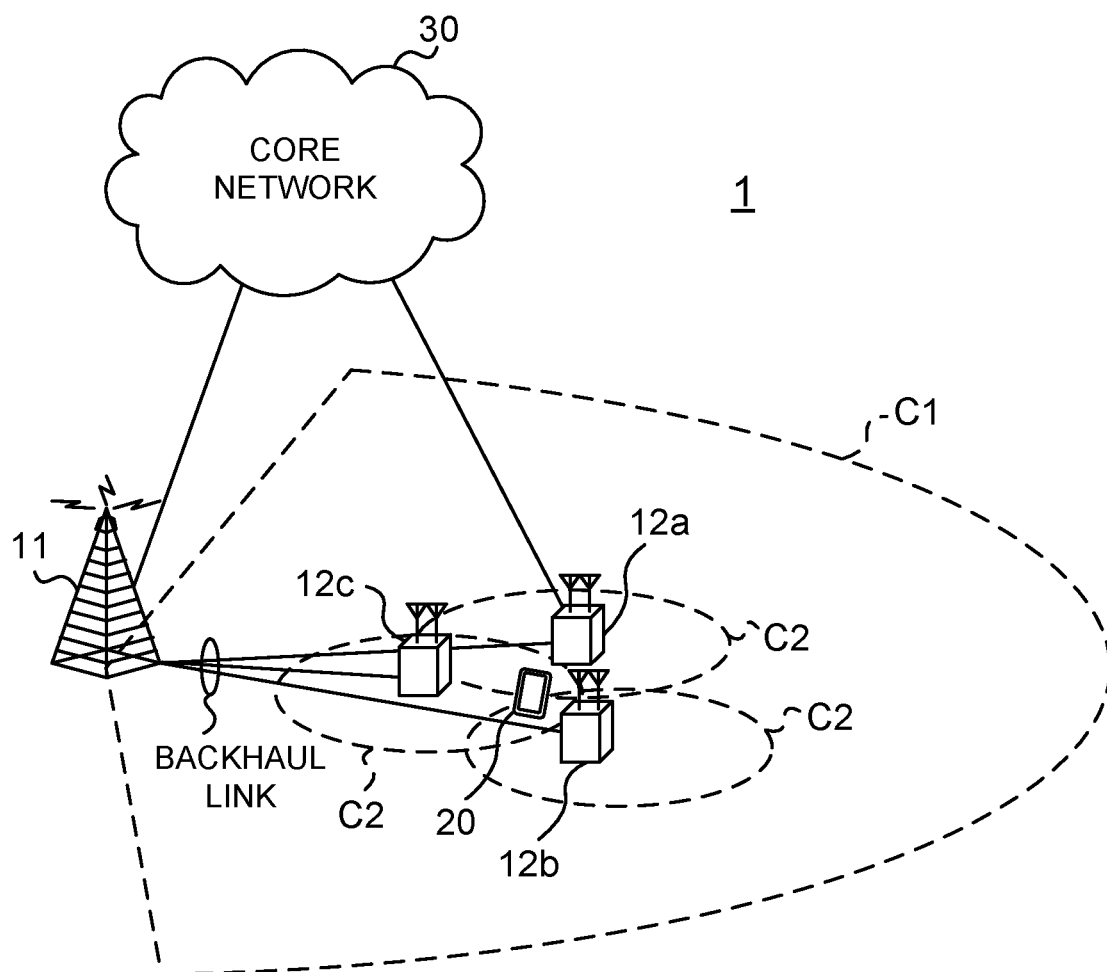
FIG. 18 is a diagram to show an example of a schematic structure of a radio communication system according to one embodiment.

FIG. 18 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are transmitted on the PDSCH. User data, higher layer control information and so on may be transmitted on the PUSCH. The Master Information Blocks (MIBs) may be transmitted on the PBCH.

Lower layer control information may be transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data," and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be transmitted by means of the PUCCH. By means of the PRACH, random access preambles for establishing connections with cells may be transmitted.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

(Base Station)

Figure 19:
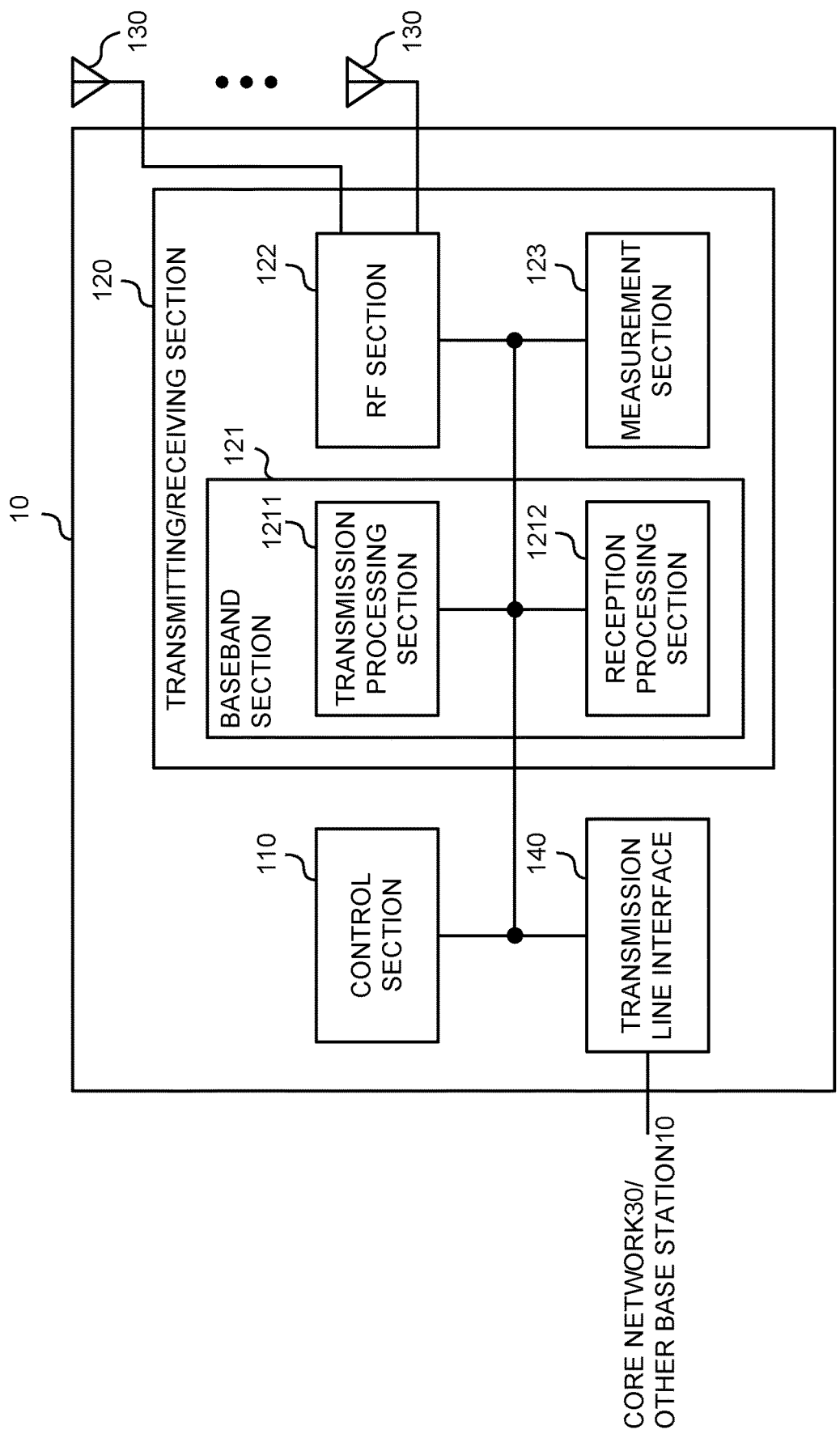
FIG. 19 is a diagram to show an example of a structure of a base station according to one embodiment.

FIG. 19 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit a reference signal (for example, SSB, CSI-RS, or the like). The transmitting/receiving section 120 may transmit information (MAC CE or DCI) indicating a TCI state for specific DL transmission. The TCI state may indicate at least one of a reference signal (for example, SSB, CSI-RS, or the like), a QCL type, and a cell transmitting the reference signal. The TCI state may indicate one or more reference signals. One or more reference signals may include a reference signal of QCL type A, or a reference signal of QCL type D.

The control section 110 may assume that a first reference signal of a spatial relation for a specific uplink transmission (for example, SRS, PUCCH, PUSCH, or the like) is a second reference signal of QCL type D (for example, SSB, CSI-RS) in the transmission control indication (TCI) state or quasi-co-location (QCL) assumption of a specific downlink channel (for example, PDCCH, PDSCH, or the like).

(User Terminal)

Figure 20:
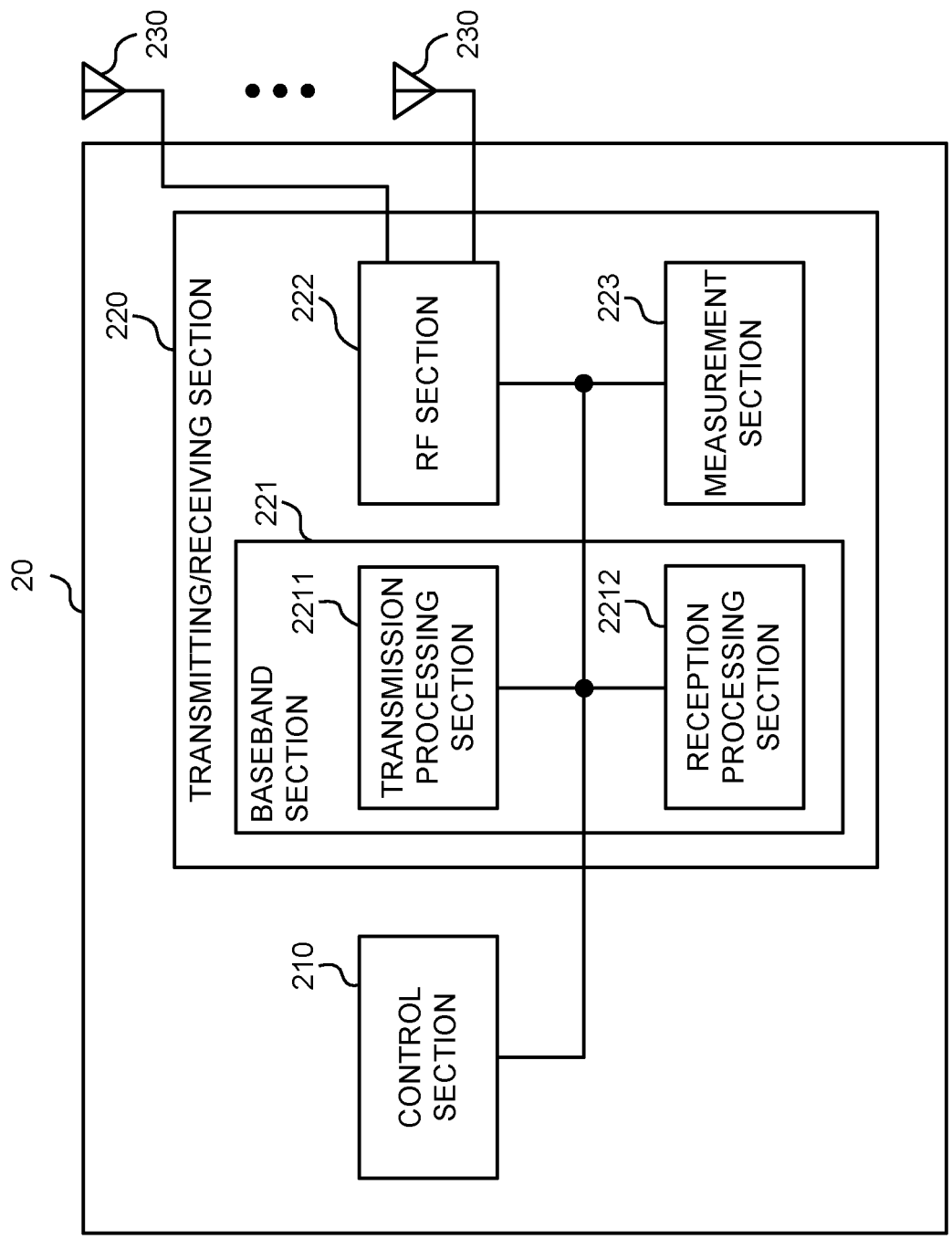
FIG. 20 is a diagram to show an example of a structure of a user terminal according to one embodiment.

FIG. 20 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be constituted as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (the RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (the RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (the measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may determine power control parameters (for example, at least one of a pathloss reference RS, α, P0, and a power control adjustment state) for a sounding reference signal (SRS) based on a medium access control—control element (MAC CE). The transmitting/receiving section 220 may use transmission power based on the power control parameter to transmit the SRS.

The control section 210 may be configured with an SRS resource set or an SRS resource including a plurality of candidates for a reference signal for pathloss reference (pathloss reference RS), and may determine one of the plurality of candidates based on the MAC CE (in the first embodiment, the power control parameter configuration information 1, 2, 4, and 5).

The control section 210 may be configured with an SRS resource or spatial relation information including a plurality of candidates for a reference signal for pathloss reference, and may determine one of the plurality of candidates based on the MAC CE (in the first embodiment, the power control parameter configuration information 3 and 6).

The MAC CE may indicate at least one of the SRS resource set and the SRS resource, and the reference signal for pathloss reference (in the second embodiment).

The MAC CE may indicate one identifier of an ID, the SRS resource set, the SRS resource, and the reference signal for pathloss reference, and the control section 210 may determine a power control adjustment state associated with the identifier (in the third embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 21:
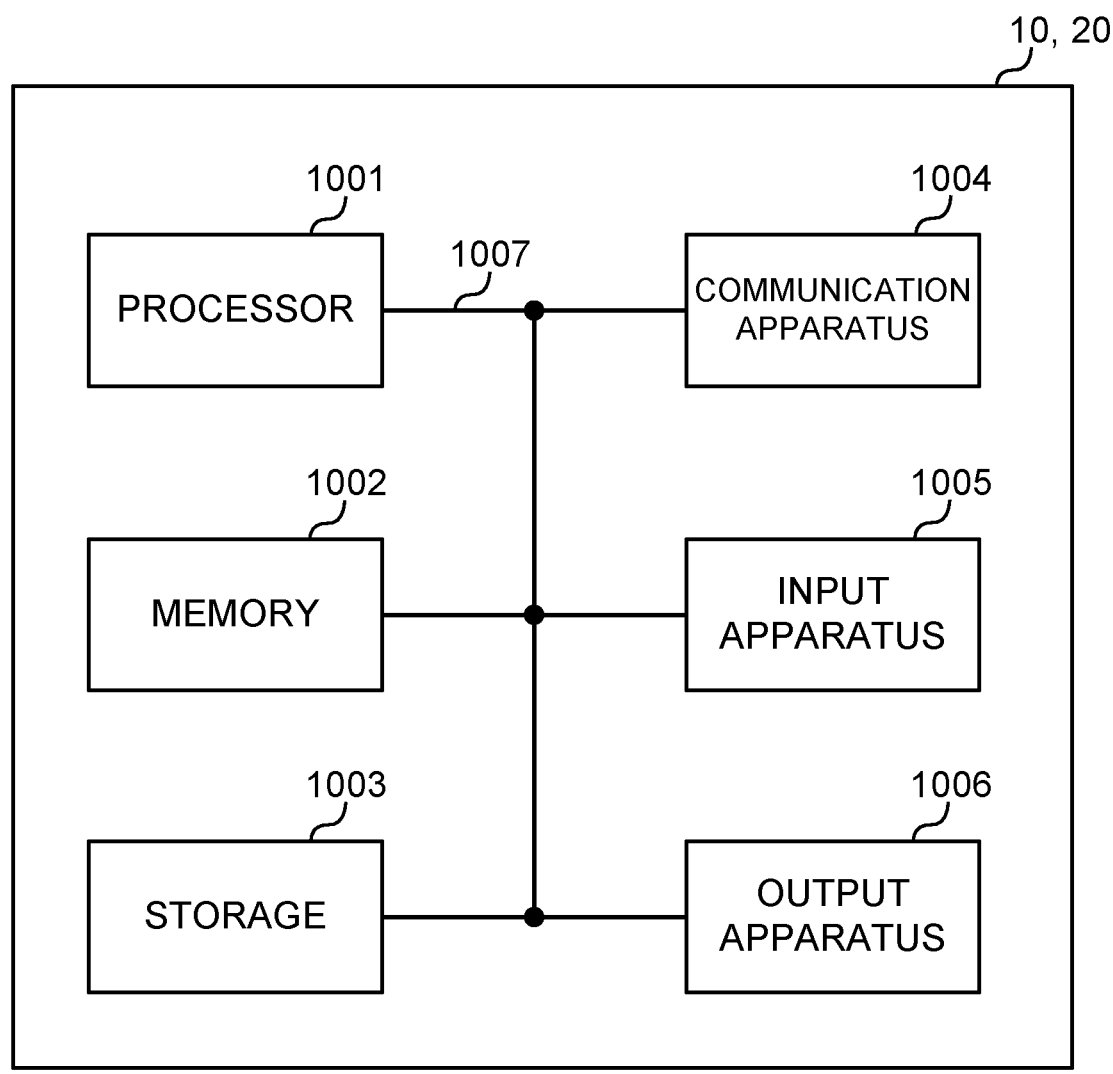
FIG. 21 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 21 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be indicated by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmission power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB,"

an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a receiver that receives a Radio Resource Control (RRC) control element including a sounding reference signal (SRS) resource set ID, a list of SRS resource IDs within the SRS resource set, and a list of reference-signal-for-pathloss-reference IDs, and then receives a medium access control-control element (MAC CE) indicating the SRS resource set ID, and a reference-signal-for-pathloss-reference ID out of the list of reference-signal-for-pathloss-reference IDs; and
    a processor that, after receiving the MAC CE, estimates a pathloss, to be applied to a transmission of an SRS using the plurality of SRS resources within the SRS resource set using a reference signal corresponding to the reference-signal-for-pathloss-reference ID.

2. The terminal according to claim 1, wherein after receiving a second MAC CE that indicates the SRS resource set ID, and a second reference-signal-for-pathloss-reference ID out of the list of reference-signal-for-pathloss-reference IDs, the processor estimates a pathloss, to be applied to a transmission of an SRS using the plurality of SRS resources within the SRS resource set, using a reference signal corresponding to the second reference-signal-for-pathloss-reference ID.

3. A radio communication method for a terminal, comprising:
    receiving a Radio Resource Control (RRC) control element including a sounding reference signal (SRS) resource set ID, a list of SRS resource IDs within the SRS resource set, and a list of reference-signal-for-pathloss-reference IDs;
    receiving a medium access control-control element (MAC CE) indicating the SRS resource set ID, and a reference-signal-for-pathloss-reference ID out of the list of reference-signal-for-pathloss-reference IDs, and
    after receiving the MAC CE, estimating a pathloss, to be applied to a transmission of an SRS using the plurality of SRS resources within the SRS resource set using a reference signal corresponding to the reference-signal-for-pathloss-reference ID.

4. A base station comprising:
    a transmitter that transmits a Radio Resource Control (RRC) control element including a sounding reference signal (SRS) resource set ID, a list of SRS resource IDs within the SRS resource set, and a list of reference-signal-for-pathloss-reference IDs, and then transmits a medium access control-control element (MAC CE) indicating the SRS resource set ID, and a reference-signal-for-pathloss-reference ID out of the list of reference-signal-for-pathloss-reference IDs, and
    a processor that controls a reception of an SRS using the plurality of SRS resources within the SRS resource set,
    wherein after transmitting the MAC CE, the processor estimates a pathloss, to be applied to a transmission of the SRS using the plurality of SRS resources within the SRS resource set, using a reference signal corresponding to the reference-signal-for-pathloss-reference ID.

5. A system comprising a terminal and a base station, wherein the terminal comprises:
    a receiver that receives a Radio Resource Control (RRC) control element including a sounding reference signal (SRS) resource set ID, a list of SRS resource IDs within the SRS resource set, and a list of reference-signal-for-pathloss-reference IDs, and then receives a medium access control-control element (MAC CE) indicating the SRS resource set ID, and a reference-signal-for-pathloss-reference ID out of the list of reference-signal-for-pathloss-reference IDs; and
    a processor that, after receiving the MAC CE, estimates a pathloss, to be applied to a transmission of an SRS using the plurality of SRS resources within the SRS resource set using a reference signal corresponding to the reference-signal-for-pathloss-reference ID, and
    the base station comprises:
    a transmitter that transmits the RRC control element, and then transmits the MAC CE; and
    a processor that controls a reception of the SRS.

* * * * *